(12) United States Patent
Lofy et al.

(10) Patent No.: US 7,114,771 B2
(45) Date of Patent: Oct. 3, 2006

(54) CLIMATE CONTROLLED SEAT

(75) Inventors: John Lofy, Claremont, CA (US); Todd Jackson, Pasadena, CA (US); John Terech, Brownstown, MI (US)

(73) Assignee: Amerigon, Inc., Dearborn, MI (US)

( * ) Notice: Subject to any disclaimer, the term of this patent is extended or adjusted under 35 U.S.C. 154(b) by 0 days.

(21) Appl. No.: 10/853,779

(22) Filed: May 25, 2004

(65) Prior Publication Data

US 2005/0264086 A1 Dec. 1, 2005

(51) Int. Cl.
*A47C 7/72* (2006.01)
*A47C 7/02* (2006.01)

(52) U.S. Cl. .............................. 297/180.13; 297/180.1; 297/452.42

(58) Field of Classification Search ........... 297/180.13, 297/180.14, 452.42, 180.1
See application file for complete search history.

(56) References Cited

U.S. PATENT DOCUMENTS

| | | | |
|---|---|---|---|
| 3,486,177 A * | 12/1969 | Marshack | ........................ 5/726 |
| 4,002,108 A * | 1/1977 | Drori | ........................... 454/120 |
| 5,106,161 A * | 4/1992 | Meiller | .................. 297/452.46 |
| 5,524,439 A | 6/1996 | Gallup et al. | |
| 5,597,200 A | 1/1997 | Gregory et al. | |
| 5,626,021 A | 5/1997 | Karunasiri et al. | |
| 5,645,314 A * | 7/1997 | Liou | ...................... 297/180.14 |
| 6,059,018 A * | 5/2000 | Yoshinori et al. | .............. 165/42 |
| 6,062,641 A * | 5/2000 | Suzuki et al. | ............. 297/180.1 |
| 6,119,463 A | 9/2000 | Bell | |
| 6,223,539 B1 | 5/2001 | Bell | |
| 6,481,801 B1 * | 11/2002 | Schmale | ................. 297/452.27 |
| RE38,128 E | 6/2003 | Gallup et al. | |
| 6,598,251 B1 * | 7/2003 | Habboub et al. | ............... 5/654 |
| 6,606,866 B1 | 8/2003 | Bell | |
| 6,700,052 B1 | 3/2004 | Bell | |
| 6,774,346 B1 * | 8/2004 | Clothier | ....................... 219/620 |
| 6,786,541 B1 * | 9/2004 | Haupt et al. | ............. 297/180.1 |
| 6,857,697 B1 * | 2/2005 | Brennan et al. | ........ 297/180.13 |
| 2002/0096915 A1 * | 7/2002 | Haupt et al. | ............ 297/180.13 |
| 2004/0164594 A1 | 8/2004 | Stoewe et al. | |
| 2004/0195870 A1 * | 10/2004 | Bohlender et al. | ........ 297/180.1 |
| 2005/0067862 A1 * | 3/2005 | Iqbal et al. | ............ 297/180.11 |

\* cited by examiner

*Primary Examiner*—Peter M. Cuomo
*Assistant Examiner*—Sarah B. McPartlin
(74) *Attorney, Agent, or Firm*—Knobbe, Martens, Olson & Bear, LLP.

(57) ABSTRACT

A vehicle seat has a seat bottom and seat back. The seat bottom can have a ventilated insert located between the seat upholstery and the seat cushion. The insert can be in fluid communication with the cabin space of the vehicle. In one arrangement, the insert has a cover with holes and a body. The cover and body cooperate to form a plurality of plenums for passing air through the insert. A fluid system can deliver air to the insert so that the air passes through the plenums and directed out of the holes in the cover. The air then flows out of the vehicle seat to control the climate around the person in the seat. The insert can also be used to remove air near the seat by drawing air proximate the seat into the insert. The air can then pass through the insert and is delivered to the fluid system.

14 Claims, 12 Drawing Sheets

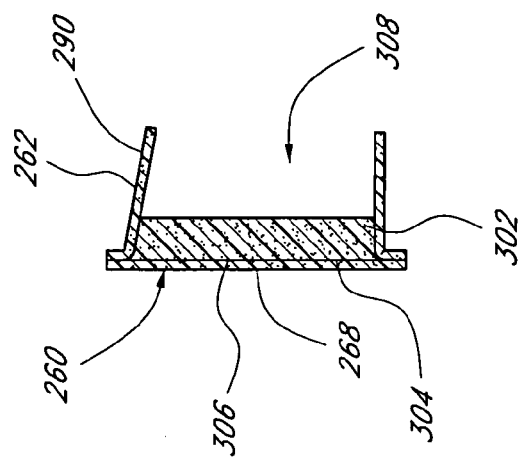
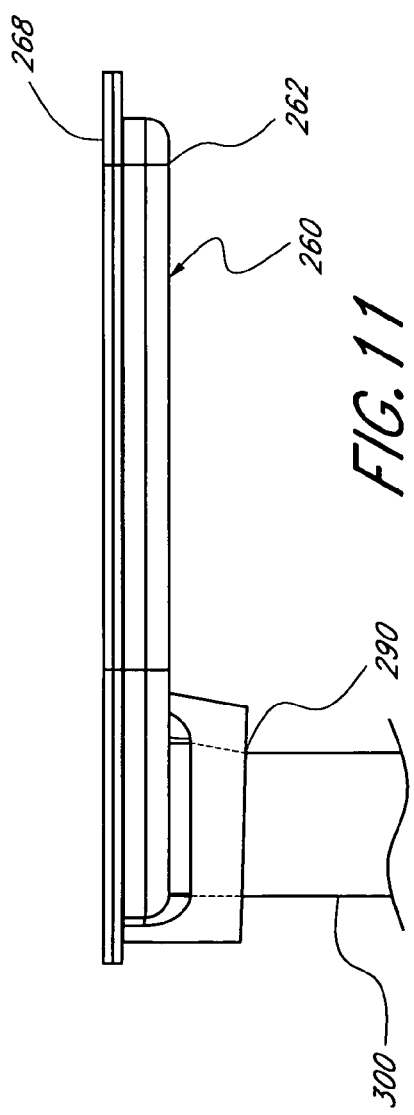
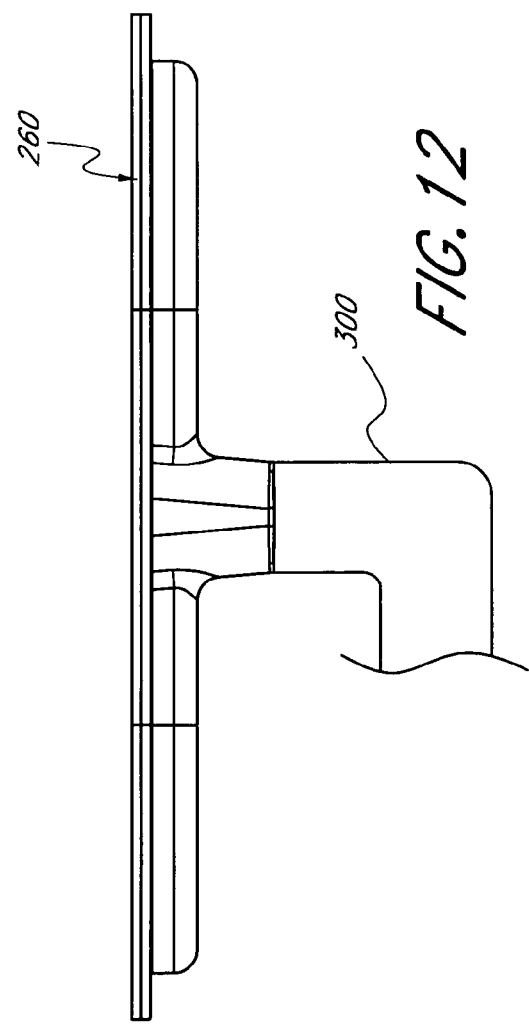

CLIMATE CONTROLLED SEAT

BACKGROUND OF THE INVENTION

1. Field of the Invention

This invention relates to climate control. More specifically, this invention relates to climate control of a seat.

2. Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period of time, can cause the vehicle seat to be very hot and uncomfortable for the occupant for some time after entering and using the vehicle, even with normal air conditioning. Furthermore, even with normal air-conditioning, on a hot day, the seat occupant's back and other pressure points may remain sweaty while seated. In the winter time, it is highly desirable to have the ability to quickly warm the seat of the occupant to facilitate the occupant's comfort, especially where the normal vehicle heater is unlikely to warm the vehicle's interior as quickly. For such reasons, there have long been various types of individualized climate control systems for vehicle seats.

There are, however, other problems that have been experienced with existing climate control systems for seats. For example, some climate control systems are not easily integratable into existing seat construction methods. Such systems require a significantly greater number of parts as compared to existing automotive seats, and often require complex mechanical parts. In the past, this has resulted in increased costs for individualized occupant cooling in automobiles. Also, the mechanical comfort of the seat is appreciably affected in the systems employed, as compared to the comfort provided by standard automotive seats. Many times the user is able to distinguish between the comfort of seats with individualized occupant cooling and standard automotive seats. Further, the current techniques are problematic because they may limit the ability for vehicle designers to provide modern seating embodiments and stylistic designs.

Thus there is a need for an improved climate control system for seats.

SUMMARY OF THE INVENTION

Accordingly, one embodiment involves a vehicle seat comprising a seat cushion defining a recess region and an insert comprising a cover and a body the cover and the body cooperate to define a plurality of elongated passages disposed adjacent to an upper surface of a seat. The cover has a plurality of openings with each of the openings being connected to the elongated passage so that fluid can pass through the cover by passing through the openings. The body is less air permeable than a substantial portion of the seat cushion.

Another embodiment involves a ventilated insert apparatus for providing air flow through a vehicle seat. The insert comprises a body comprising closed cell foam and at least one channel and an air flow inlet. The at least one channel is configured to receive air flow from the inlet. The at least one channel is proximate and generally parallel to a sitting surface of a seat and has a pair of generally opposing side walls. The body also has a flange extending from an upper portion of the opposing side walls. A cover is configured to attach to the body and has a plurality of openings. When the cover is attached to the body, the cover and the body define fluid passages from the inlet to the openings of the cover.

Another embodiment involves a method for producing an air circulation seat that comprises providing seat support member having at least one seat channel, providing an insert configured to fit within the at least one support channel and to communicate with the inlet, positioning the insert into the at least one seat channel and securing a seat covering material over the seat support member and the insert. In one embodiment, the seat support member has a trench used to upholster the seat support member and the insert has at least one insert channel for passing air through the insert that mates with the trench. The insert and has a cover configured to pass air between the insert channel and the exterior of the insert.

BRIEF DESCRIPTION OF THE DRAWINGS

FIG. 10A is a cross sectional view of the insert of FIG. 9 taken along 10a—10a;

FIG. 11 is a side elevational view of the insert of FIG. 9;

FIG. 12 is another side elevational view of the insert of FIG. 9;

FIG. 13 is a cross sectional view of the insert of FIG. 9 taken along 13—13;

DETAILED DESCRIPTION OF THE PREFERRED EMBODIMENT

The preferred embodiments described herein generally relate to seats in the form of vehicle or automotive seats. Generally a vehicle seat can have a seat bottom and seat back. In some embodiments, the seat bottom can have an insert located between the seat upholstery and the seat cushion. The insert can be in fluid communication with the cabin space of the vehicle. Air can flow through the insert and out of the seat to control the climate around the person in the seat. The insert can also be used to remove air from the cabin of the vehicle. The air can then pass through the insert and is delivered to a fluid line.

To assist in the description of the disclosed embodiments, words such as upward, upper, downward, lower, vertical, horizontal, upstream, and downstream are used to describe the accompanying figures. It will be appreciated, however, that the illustrated embodiments can be located and oriented in a variety of desired positions.

Figure 1:
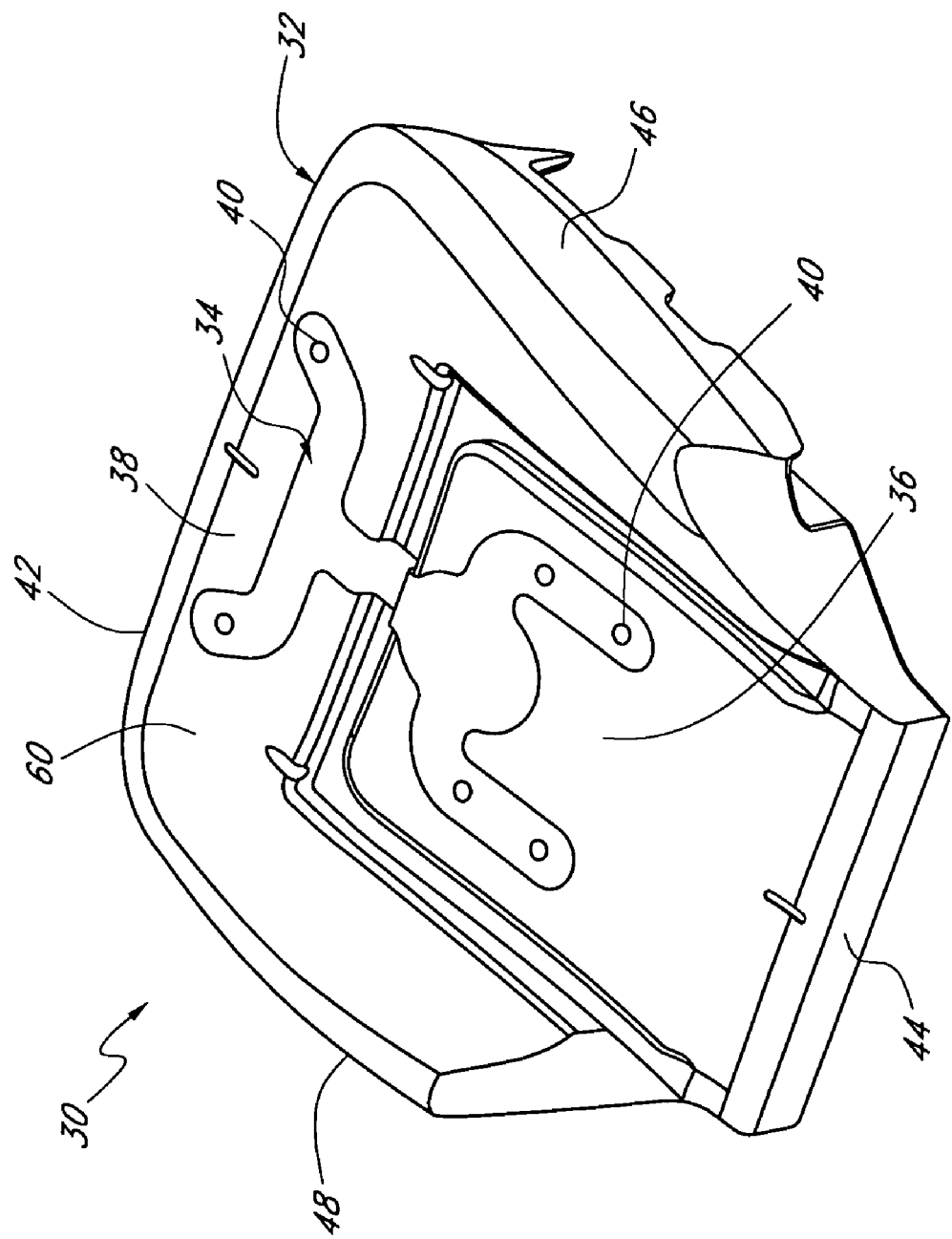
FIG. 1 is a perspective view of a seat bottom of a vehicle seat, the seat bottom having an insert.

FIG. 1 illustrates an exemplary embodiment of a seat assembly 30 that comprises a seat bottom 32 and an insert 34, which will be described in detail below. The seat assembly 30 can accommodate and support a portion of a person in a sitting position. When the person sits in the seat assembly 30, the person's seat can be located in a seat area 36 of the seat assembly 30 and at least a portion of their legs can be supported by a thigh area 38 of the seat assembly 30. As will be described below, in one embodiment, the insert 34 is configured to deliver and/or remove air from the cabin space of a vehicle by passing air through apertures or openings 40 for providing a comfortable environment. For example, the air delivered or removed by the insert 34 can advantageously control the temperature of the occupant.

Figure 1A:
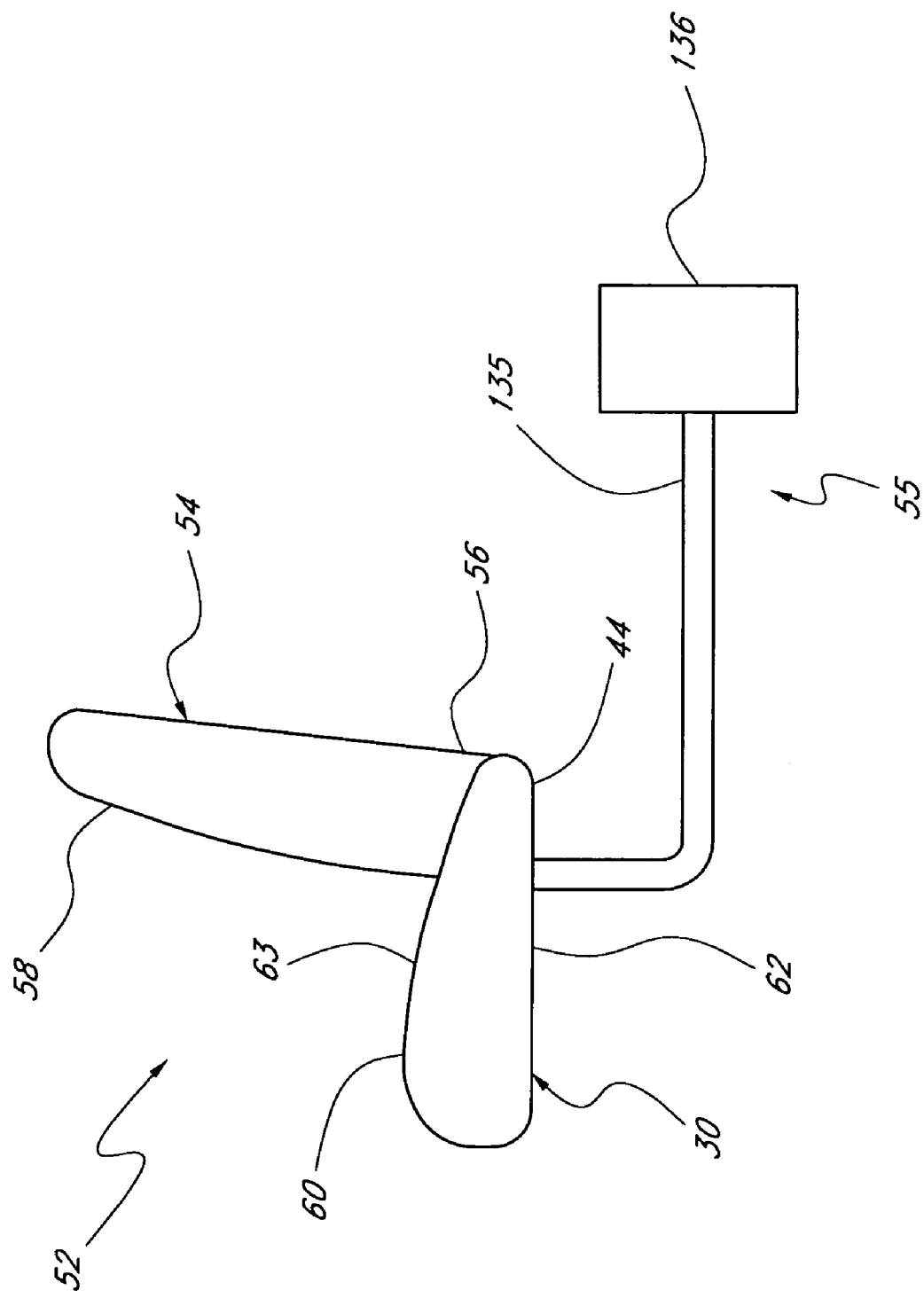
FIG. 1A is a side view of a vehicle seat having the seat bottom of FIG. 1 and a seat back, the vehicle seat is attached to a fluid system.

The seat assembly 30 has a front end 42 and a rear end 44. The seat assembly 30 also has a pair of sides 46, 48 extending between the ends 42, 44 for providing lateral support to the occupant of the seat assembly 30. As shown in FIG. 1A, the rear end 44 can be configured to be coupled to a seat back 54 such that the seat bottom 32 and the seat back 54 cooperate to define a sitting area.

In the illustrated embodiment, the seat assembly 30 is not upholstered. However, the seat assembly 30 can be covered with material, such as automotive upholstery, that is preferably air-permeable.

As mentioned above, FIG. 1A illustrates the seat assembly 30 in combination with the seat back 54 to form an exemplary embodiment of an automotive seat 52. A fluid system 55 is in fluid communication with the seat 52 so that seat 52 provides air flow to the person disposed within the seat 52. In one embodiment, the fluid system 55 delivers air to the seat 52 which in turn expels air into the environment surrounding the seat 52. In another embodiment, air can be removed from the cabin space as air exterior to the seat 52 is passed through at least a portion of the seat 52 and into the fluid system 55.

In this embodiment, the rear end 44 of the seat assembly 30 may be coupled to a bottom end 56 of the back assembly 54. When the occupant sits in the seat 52, the occupant's back contacts the surface 58 of the back assembly 54 and the occupant's seat and legs contact a surface 60 of the seat assembly 30. The surfaces 58, 60 cooperate to support the occupant, preferably in a comfortable sitting position. The seat 52 can be configured and sized to accommodate occupants of various size and weight. One of ordinary skill in the art can determine the appropriate size and configuration of the seat 52 to achieve the desired sitting area for a particular person and vehicle. In the illustrated embodiment, the seat 52 is similar to a standard automotive seat.

With continued reference to FIG. 1A, a bottom 62 of the seat assembly 30 can be attached to the floor pan of a vehicle by fasteners. However, the seat 52 can be attached in other suitable manners to the vehicle as those skilled in the art can appreciate.

The seat 52 is upholstered with material 63. As explained below, the insert 34 (see FIG. 1) is preferably proximate the upholstery material 63 so that air passages through the insert 34 are generally parallel with the material 63. In such embodiments, the insert 34 of the seat assembly 30 can be generally horizontal and located adjacent and below the material 63. Thus, in these embodiments, the material 63 is between the person in the seat 52 and the insert 34.

Although, the insert 34 is illustrated within a seat 52 which is typically found in automotive vehicles, the insert 34 can be used in a variety of applications and environments. For example, the seat 52 can be a seat that is used in other settings and environments. Although not illustrated, the seat 52 can be a vehicle seat, such as an airplane seat, a boat seat, or the like. Further, the seat 52 can be a chair, sofa, theater seat, office seat that is used in a place of business and/or residence. Those skilled in the art will recognize that the disclosed embodiments can be used in a variety of settings.

Figure 2:
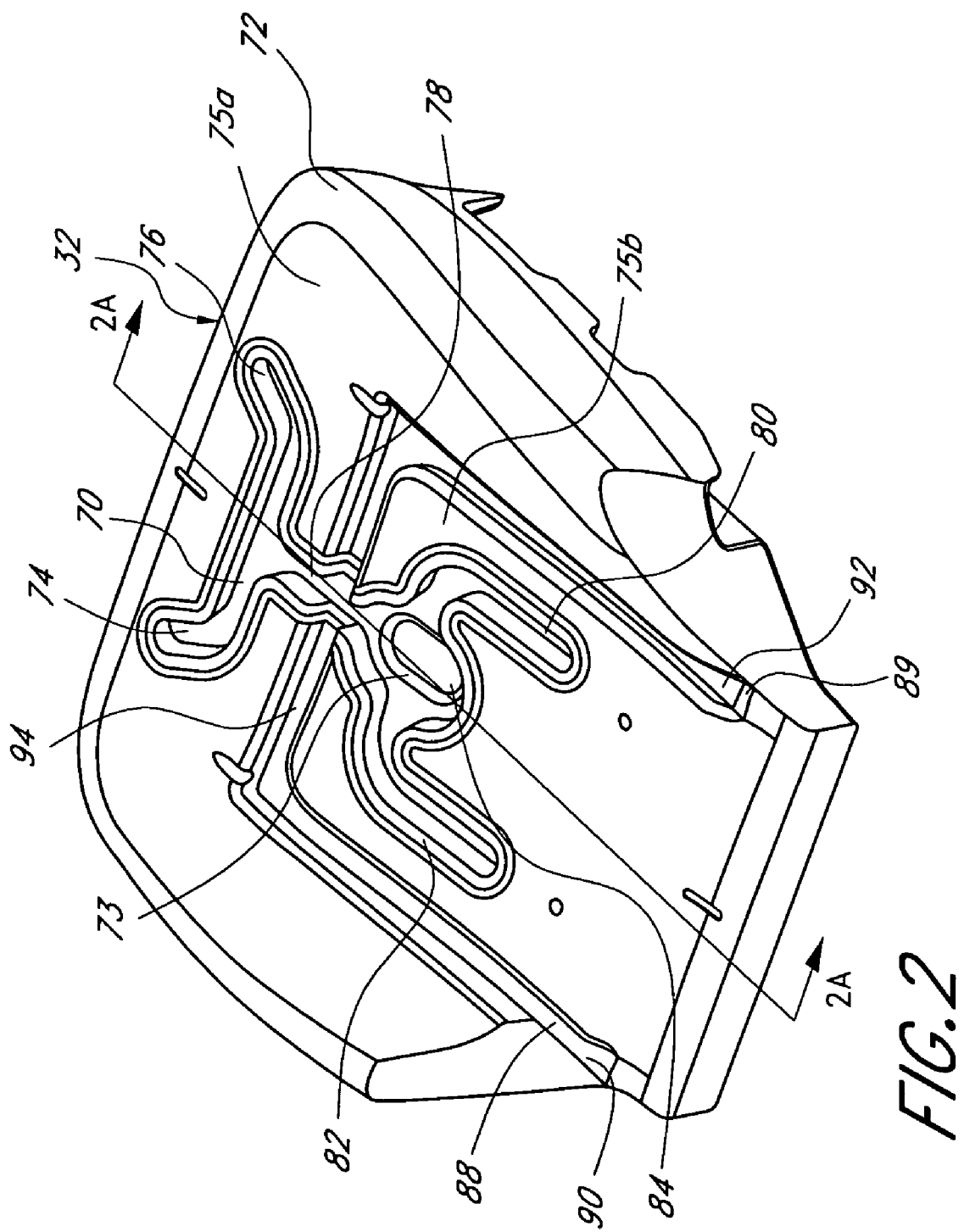
FIG. 2 is a perspective view of the seat bottom of FIG. 1 without the insert.

FIG. 2 illustrates the seat bottom 32 with the insert 34 removed. The seat bottom 32 comprises a recess region 70, a seat cushion 72, and an aperture or opening 73. Although not illustrated, the seat bottom 32 can have springs and a frame that in combination provide structural support to the cushion 72.

The recess region 70 is preferably configured to receive and hold the insert 34. In the illustrated embodiment, the shape of the recess region 70 is generally similar in shape to at least a portion of the insert 34, so that a substantial portion of the insert 34 can sit within the seat cushion 72 such that an upper portion of the insert 34 is preferably flush with the surface of the cushion 72 for a generally smooth, continuous upper surfaces 75a, 75b of the seat assembly 30, thereby providing a comfortable sitting surfaces.

In the illustrated embodiment, the recess region 70 comprises a hole region 84 and a first channel 78, a pair of side channels 80, 82 and a pair of branch channels 74, 76 extending from the first channel 78. The hole region 84 may comprise a passage extending from the opening 73 defined by the bottom 62 to upper portion of the cushion 72. In one embodiment, the hole region 84 is a through-hole having an generally elliptical cross section. The through-hole can have a cross section that varies along its longitudinal axis. In one arrangement, the through-hole gradually increase in size in the vertical direction. In another embodiment, the through-hole has a generally uniform cross section along its longitudinal axis. It is contemplated that the hole region 84 can have any shape cross section, such as a circular or rectangular cross section, that is suitable for passing air to the insert 34.

Figure 2A:
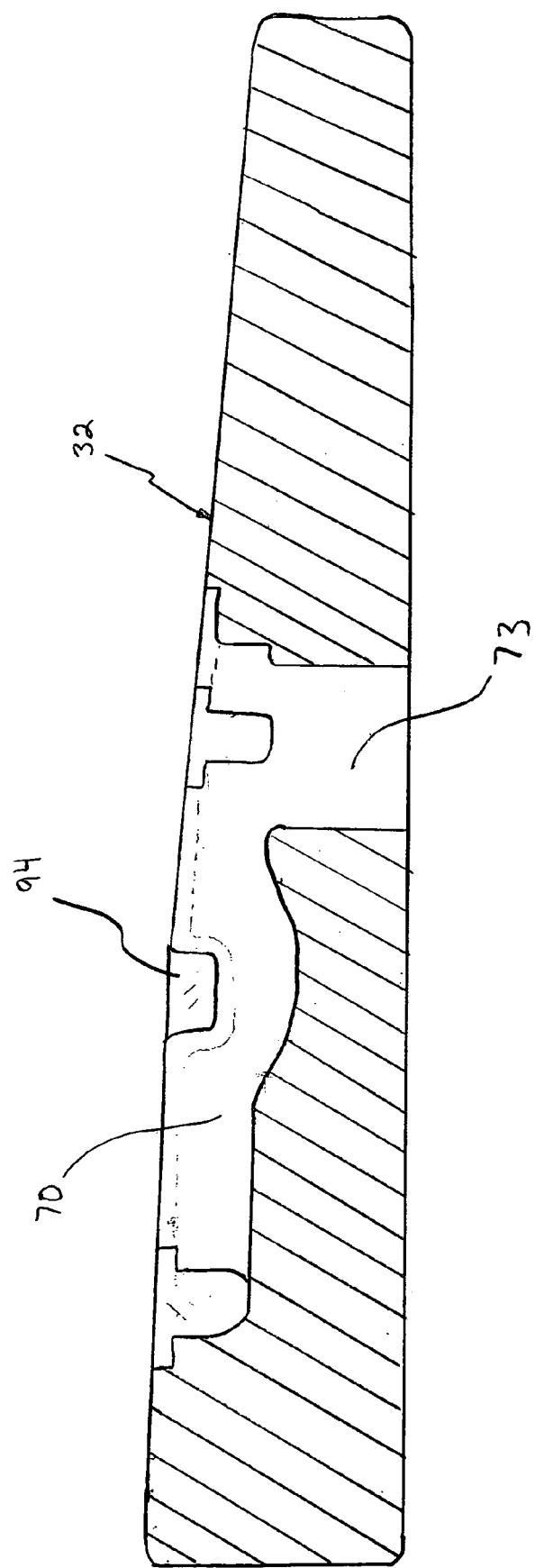
FIG. 2A is a cross sectional view of the seat bottom of FIG. 2 taken along 2A—2A.

With reference to FIGS. 2 and 2A, the size of the opening 73 is preferably determined by the desired flow rate to/from the insert 34. The opening 73, for example, can have an increased area to accommodate an increased amount of air flowing through the seat bottom 32 to the insert 34.

With particular reference to FIG. 2, in the illustrated embodiment, the side channels 80, 82 are disposed and connected to opposing sides of the hole region 84. Each of the side channels 80, 82 has a generally L-shape and the hole region 84 is located at one end of the side channels 80, 82. The hole region 84 is also located at one end of the first channel 78.

The first channel 78 extends from the hole region 84 to the branch channels 74, 76. The branch channels 74, 76 extend from the first channel 78 and comprise two generally straight channels at an angle to each other. In another embodiment, a portion of the branch channels 74, 76 may form a substantially straight channel perpendicular to the channel 78.

In the illustrated embodiment, each of the channels defined by the cushion 72 has a generally u-shaped cross section. However, the channels of the recess region 70 can have other shapes suitable for receiving and holding the insert 34. Additionally, each of the channels 74, 76, 78, 80, 82 of the recess region 70 can have a different cross sectional profile than the other channels. As will be explained below, the cross section of these channels can be modified to accommodate varying insert geometries to achieve, for example, desired optimal hydraulic diameters.

With continued reference to FIG. 2, the seat bottom 32 has a tie-down trench 88 that can be used to upholster the seat bottom 32. In the illustrated embodiment, the trench 88 comprises the side trenches 90, 92 and an end trench 94. In the illustrated embodiment, the pair of side trenches 90, 92 are connected by the end trench 94 such that the trench 88 has a generally u-shaped configuration. The trench 88 may have a u-shaped cross section as shown in FIG. 2 and may be received in a similarly shaped recess 89 formed in the seat bottom 32. However, the trench 88 and/or the recess 89 can have other suitable cross sections so that the seat 32 can be conveniently, and preferably rapidly, upholstered as is known in the art. For example, in one embodiment, the trench 88 has a semi-circular cross section. The bottom of the trench 88 can be configured to provide a structure for coupling upholstering material to the seat 32. In one embodiment, the trench 88 comprises a wire mesh that can be easily coupled to upholstery stitching. Further, a portion of the trench 88 can be formed of foam and portion of the trench 88 can be formed of a wire mesh.

As mentioned above, the illustrated trench 88 has a generally u-shaped configuration with the pair of side trenches 90, 92 having longitudinal axes that are generally parallel and are on either side of the insert 34. The side trenches 90, 92 are preferably spaced from the insert 34 so that the cushion 72 provides sufficient structural support to the insert 34 to prevent, for example, the collapse of the insert 34 when the occupant sits in the seat 52. The longitudinal axes of the side trenches 90, 92 can also be generally parallel with the sides 44, 46. The end trench 94 extends between the ends of the side trenches 90, 92 and extends on either side of the insert 34.

In one embodiment, the end trench 94 is disposed above at least a portion of the insert 34 (see also FIG. 2A). In such an embodiment, end the trench 94 can be disposed above the insert 34 so that the seat upholstery can be attached to the end trench 94 at a location above the insert 34. In other embodiments, portions of the trench 88 can be located above different portions of the insert 34 depending on the configuration of the insert 34 and the trench 88. In the illustrated embodiment, the end trench 94 extends over the insert 34 in the area of the first channel 78. In another embodiment, the trench 88 may not extend over the insert 34. For example, in one embodiment, the end trench 94 may comprise a first portion and second portion. The first portion may extend from the channel 78 to the trench 90 and the second portion extends from the channel 78 to the trench 92. In this manner, the trench 94 and channel 78 may be configured so that the insert 34 can be received in the recess region 70 such that a portion of the insert 34 is disposed between the first and second portions of the trench 94.

As mentioned above, the cushion 72 of the seat bottom 32 is configured to accommodate and support the occupant on the seat bottom 32. It is contemplated that the seat cushion 72 can have a shape generally similar to a conventional automobile seat. The cushion 72 can be formed from typical automotive seat cushion foam. The cushion 72 can also be constructed from other types of materials with suitable characteristics for providing support to an occupant and receiving the insert 34. For example, certain preferred materials include, but are not limited to, closed or open-celled foam. One of ordinary skill in the art will recognize that other materials may used to form cushion 72 to achieve the proper support, cost and ease of manufacturing, and the like. In one embodiment, the cushion 72 is made of foam that is pre-molded to form the recess region 70. In such an embodiment, the foam may be an open celled foam that permits migration of air through the cushion 72. In another embodiment, the recess region 70 is formed in a standard automotive seat cushion made of foam and the recess region 70 may be formed by cutting foam out of the seat cushion.

As mentioned above, material (e.g., seat coverings or upholstery) can be used to surround and cover the seat bottom 32. In the illustrated embodiment of FIG. 1A, material 63 covers a substantial portion of the seat 52. The material can be air-permeable fabric for permitting airflow between the insert 34 at the inside (i.e., the passenger's compartment) or cabin space of the automobile. As will be explained in detail below, the insert 34 can thus deliver air to the occupant within the seat 52 or remove air, which is preferably proximal to the occupant of seat 52, from the inside of the automobile. The air-permeable fabric can be made of natural and/or synthetic fibers. However, the seat covering material can be any material suitable for covering the seat bottom 32. For example, the seat covering material can comprise leather, or leather-like material. To achieve adequate airflow between the insert 34 and the occupant through the leather, the seat material can have small openings or apertures for allowing air to pass between the insert 34 and cabin space of the automobile. One of ordinary skill in the art will recognize various combinations of material type, and treatments for that material, to achieve the desired airflow from the seat. In some embodiments, the back assembly 54 is upholstered with a material similar to the material covering the seat bottom 32.

Although not illustrated, a layer of material, such as foam, can be located between the material 63 which covers the seat 52 and the insert 34. The layer can be porous so that the insert 34 is in fluid communication with the cabin space of the vehicle.

Figure 3:
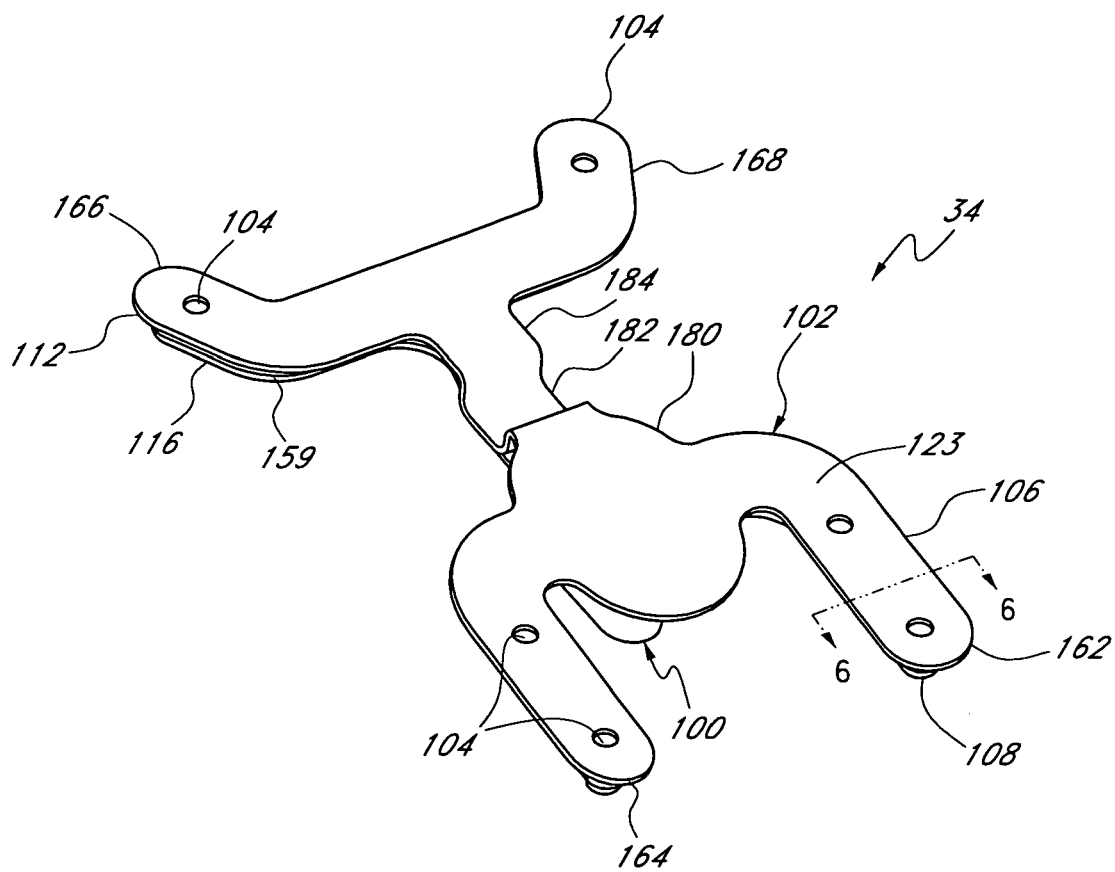
FIG. 3 is the insert of FIG. 1, the ventilation insert has a cover and a body.

FIG. 3 illustrates the insert 34 removed from the seat bottom 32. As will be explained in detail below, the insert 34 comprises a body 100, and a cover 102 that preferably includes a plurality of holes or apertures 104.

The cover or scrim 102 is attached to the body 100 so that air can pass through channels defined by the cover 102 and the body 100 and can be directed through the holes 104. The cover 102 preferably has a shape that is generally similar to the shape of the body 100. In the illustrated embodiment, the periphery 106 of the cover 102 is proximate the periphery 108 of the body 100. The edges of the cover 102 and body 100 can be flush resulting in a smooth surface formed by the cover 102 and body 100.

Figure 4:
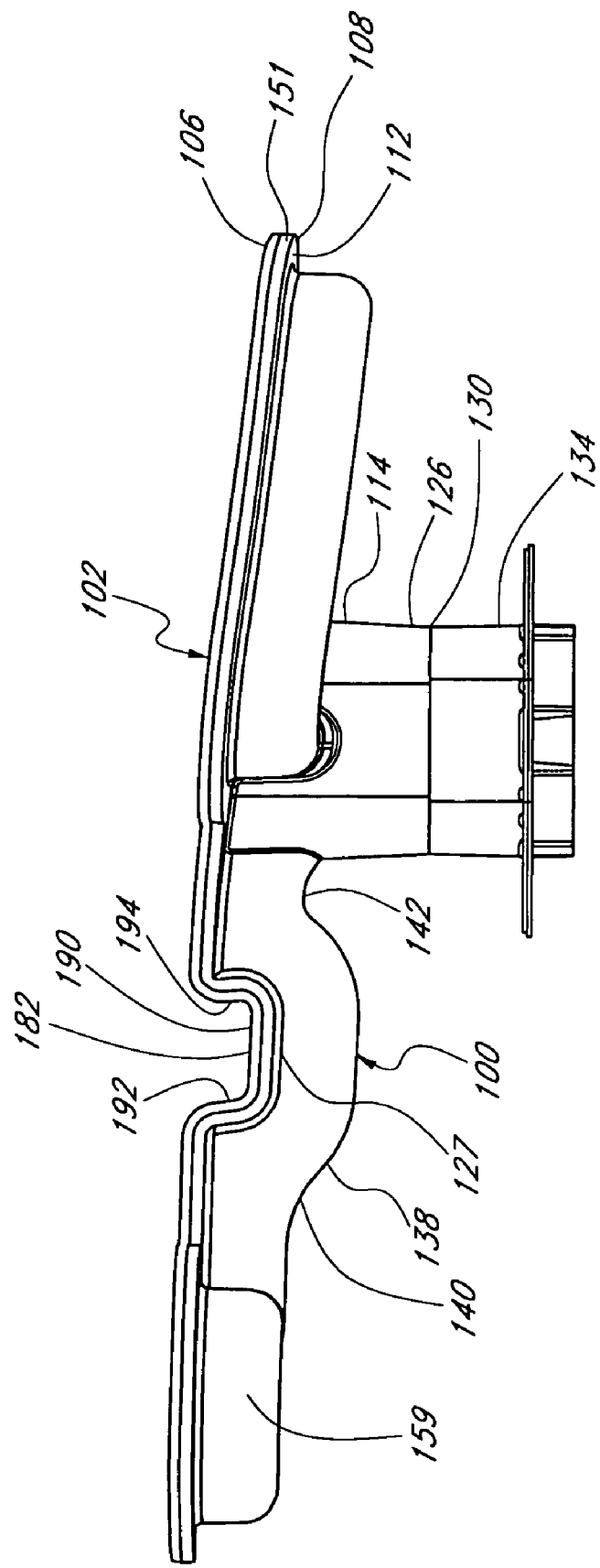
FIG. 4 is a side view of the insert of FIG. 3, the insert is connected to an air outlet/inlet.
Figure 5:
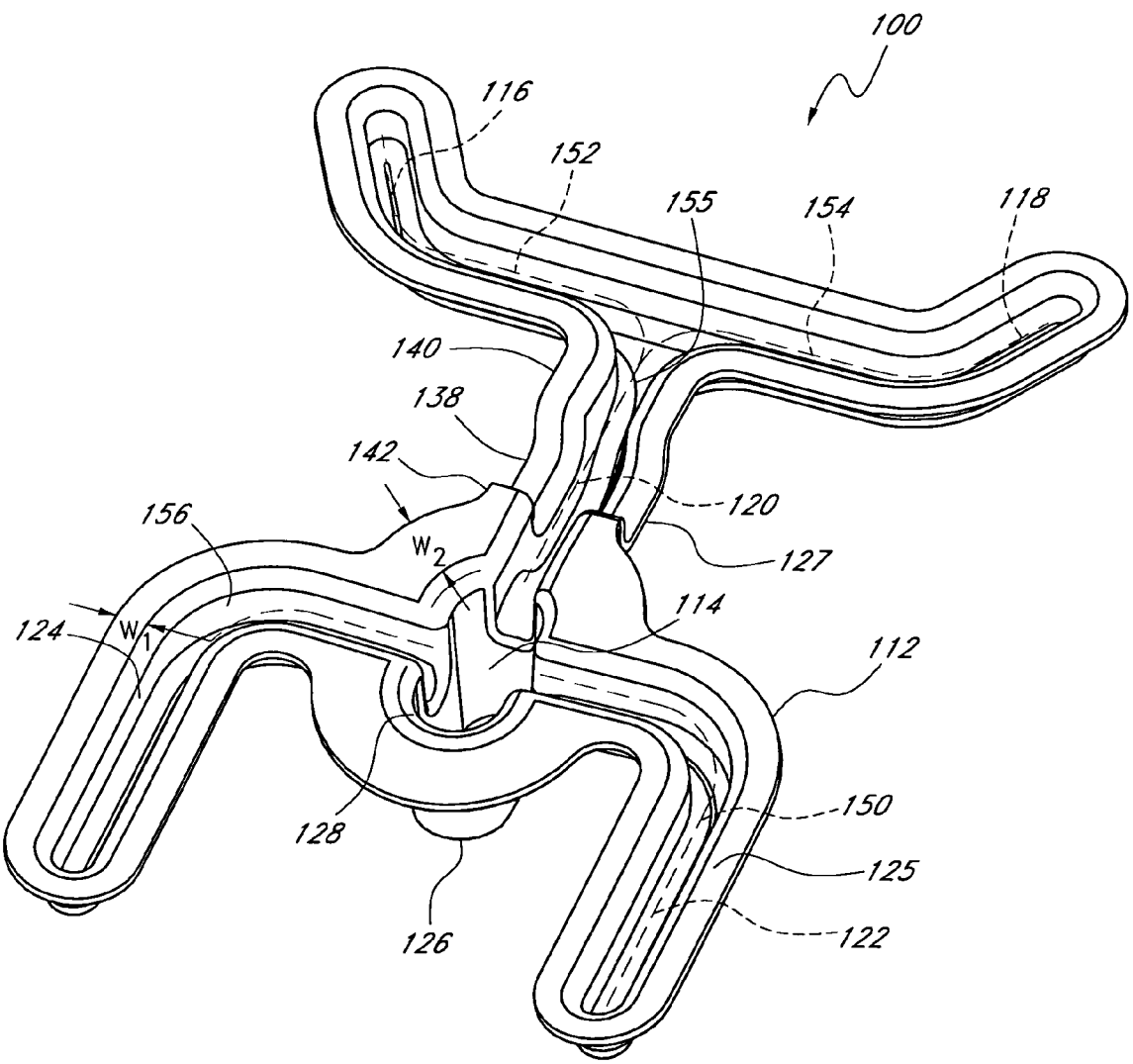
FIG. 5 is a perspective view of the body of FIG. 3.

With reference to FIG. 3 through FIG. 5, the body 100 comprises a lip or flange 112, a manifold 114, and a plurality of plenums or channels comprising a pair of branch channels 116, 118, a first channel 120 and a pair side channels 122, and 124.

In the illustrated embodiment, the flange 112 horizontally extends from and is connected to the upper portions of the plurality of the channels 116, 118, 120, 122, and 124. The lower surface of the flange 112 can contact the cushion 72 so that the upper surface 123 of the cover 102 can be flush with the seat cushion 72. When the insert 34 is disposed within the cushion 72, a portion of the flange 112 is located in the seat area 36 and generally lies within a first plane. Another portion of the flange 112 is located in the thigh area 38 and also generally lies within a second plane. The first and second planes can be at an angle to each other, as shown in FIG. 4. However, the first and second planes can be oriented in any manner so as to permit the insert 34 to be placed in to the recess 70. For example, the first and second plane can be generally parallel.

With continued reference to FIG. 5, the flange 112 can have a portion 127 configured to mate with the trench 94 and attach to the cover 102. As illustrated in FIG. 4, in this region, the portion 127 of the flange 112 can have a generally u-shaped profile.

The flange 112 has an upper surface 125 that is preferably generally flat and can be coupled to the bottom of the cover 102. The upper surface 125 provides an area that can be bonded to the cover 102 by using, for example, adhesive or heat stake. In the illustrated embodiment, the width W1 of the flange 112 is generally uniform along the portions of the flange 112 extending from the channels 116, 118, 120, 122, 124. In one embodiment, the width of a portion of the flange 112 can be equal to or greater than the width of the channels 116, 118, 120, 122, 124 that the portion of the flange 112 extends from. The area of the surface 125 provides an enlarged bonding and/or attachment surface to ensure that the cover 102 is properly secured to the body 100. In another embodiment, however, the width of a portion of the flange 112 can be equal to or less than the width of the channels 116, 118, 120, 122, 124 that the portion of the flange 112 extends from. In one embodiment, the width of the portion of the flange 112 is in the range of ½ to ¾ of the width of the channel that the portion of the flange 112 extends from. In another embodiment; the width of the portion of the flange 112 is about ½ of the width of the channel that the portion of the flange 112 extends from. In yet another embodiment, the width of the portion of the flange 112 is generally less than about ½ of the width of the channel that the portion of the flange 112 extends from.

The portions of the flange 112 extending from the upper portion of the manifold 114 has a width W2 that is preferably greater than the width W1 to provide an enlarged surface area for bonding and/or attachment the cover 102 with the body 100 in this region. The bond between the cover 102 and the flange 112 is preferably configured to prevent air from escaping the insert 34 between the cover 102 and the body 100, especially when air flows at a high flow rate through the manifold 114 and into the cover 102. Thus, the bond preferably provides a hermetic seal between the cover 102 and the body 100 and the air flowing through the insert 34 does not cause appreciable separation between the cover 102 and the body 100.

In the illustrated embodiment, the manifold 114 distributes air to the channels 116, 118, 120, 122, 124 of the insert 34. Accordingly, in the illustrated embodiment, the manifold 114 is in fluid communication with the side channels 122, 124, and the first channel 120 and is located in the seat area 36 of the seat assembly 30. The side channels 122, 124 are spaced on opposing sides of the manifold 114 while the first channel 120 is located generally midway along the surface of the manifold 114 between the side channels 122, 124. However, the channels 120, 122, 124 can be connected to the manifold 114 in any suitable manner for air passage from the manifold 114 into the channels 120, 122, 124.

The manifold 114 has an inlet/outlet 126 at one end and its other end 128 is connected to the upper flange 112. The manifold 114 is configured so that it can be received within the opening 73 in the seat bottom 32. The manifold 114 preferably has a similar shape as the opening 73 so that the opening 73 inhibits substantial movement of the insert 34. In one embodiment, the manifold 114 has a generally elliptical cross section. However, in other embodiments the manifold 114 can have circular, rectangular, and other suitable shapes for passing air into the insert 34.

As shown in FIG. 4, the inlet/outlet 126 of the manifold 114 defines an opening 130, which is configured to receive the connector 134. In one embodiment, the connector 134 and the manifold 114 form a seal, preferably a hermetic seal. Thus, there is generally no air flowing through the seal define by the manifold 114 and the connector 134.

The connector 134 is in fluid communication with the fluid system 55. In the illustrated embodiment, the fluid system 55 has a fluid line 135, shown in FIG. 1A, in the form of an air line. The air line 135 is connected to the connector 134 and provides air that passes through the connector 134 and into the manifold 114. The air line 135 can also receive air from the manifold 114 through the connector 134. Those skilled in the art can determine various configurations of the connector 134 that can be used depending on the arrangement of the manifold 114.

The line 135 provides fluid communication between the fluid device 136 and the seat 52. As mentioned above, the fluid device 136 can be a fluid source and/or vacuum device. In one embodiment, the fluid device 136 in the form of a fluid source that delivers pressurized air to the line 135. The fluid source 136 can be, for example, an air compressor or a fan or a blower. The fluid device 136 can be in the form of a vacuum device which draws air through line 135 away from the seat 152.

The fluid system 55 can comprise devices for thermally conditioning and pumping fluid (e.g., air). In one embodiment, the fluid system 55 can comprise a variable temperature control system as described in U.S. Pat. No. 6,119,463 entitled THERMOELECTRIC HEAT EXCHANGER, which is hereby incorporated by reference in its entirety. Optionally, the fluid system 55 can comprise a climate control system as described in U.S. Pat. Nos. 5,524,439 and 5,626,021 entitled VARIABLE TEMPERATURE SEAT CLIMATE CONTROL SYSTEM, which are hereby incorporated by reference in their entirety. Thus, the fluid system 55 can be used for localized cooling or heating of the person within the seat 52.

The connector 134 can be coupled to the manifold 114 by inserting the upper end of the connector 134 into the opening 130 until the connector 134 reaches the desired position. Preferably, the connector 134 is inserted into the manifold 114 until there is a generally airtight seal formed between the outer surface of the connector 134 and the inner surface of the manifold 114. Optionally a sealing member, such as an O-ring, can be disposed between the connector 134 and the manifold 114.

With reference to FIG. 5, the branch channels 116, 118 are in fluid communication with the first channel 120. Specifically, in the illustrated embodiment, the branch channels 116, 118 are connected to one end of the first channel 120 and the other end of the channel 120 is connected to the manifold 114. The branch channels 116, 118 are configured such that they are generally located in the thigh area 38 of the seat bottom 32.

As discussed above, the side channels 122, 124 are connected to the manifold 114. In the illustrated embodiment, the side channels 122, 124 are generally L-shaped channels that are generally parallel to each other. The side channels 122, 124 are configured such that are generally located in the seat area 36 of the seat bottom 32.

The illustrated arrangement of the channels 116, 118, 120, 122, 124 advantageously conveniently provides a distribution of over significant portions of the seat area 36 and the thigh area 38. However, it should be appreciated that for modified embodiments the number, shape and/or configuration of the channels 116, 118, 120, 122, 124 extending from the manifold 114 may be modified in several different manners given the goal of distributing or removing air from the seat area 36 and/or thigh area 38 of the seat bottom 32. In such modified embodiments, the configuration recess region 70 and/or the cover 104 may be appropriately modified.

With reference to FIGS. 2, 4 and 5, in the illustrated embodiment, the first channel 120 comprises a downwardly extending central portion 138. The downwardly extending portion 138 can be configured mate with the trench 94. In one embodiment, the channel 120 has ends 140, 142 that have generally coaxially longitudinal axes and the central portion 138 is located below those axes. As shown in FIG. 4, the central portion 138 can have a generally u-shaped profile. However, the central portion 138 can have other shapes to accommodate the trench 94. For example, if the trench 94 has a generally semi-circular cross section, the central portion 138 can have a similar semi-circular cross section. Thus, one of ordinary skill in the art will recognized that the shape and configuration of the central portion 138 may be appropriate modified to extend below the trench 94 such that the insert 34 can be received into the seat bottom 32.

Figure 6:
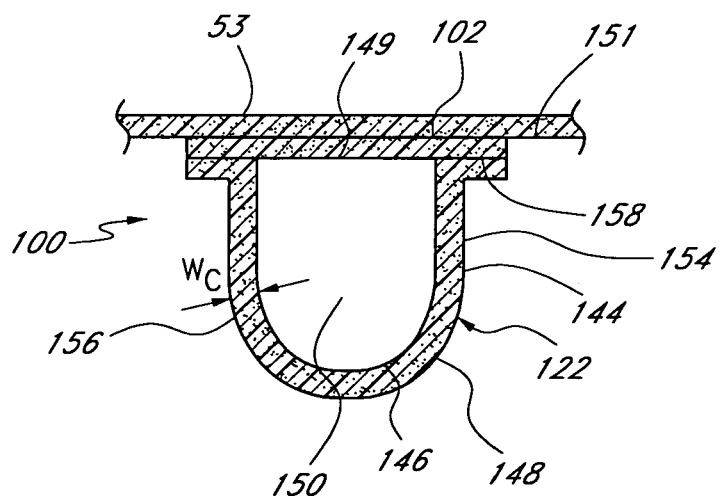
FIG. 6 is a cross sectional view of an insert taken along 6—6.

FIG. 6 is a cross sectional view along 6—6 of the insert 34 along one of the side channels 122. As shown in this Figure, the insert 34 is preferably positioned near the material 63 which covers at least a portion of the seat 52 such that air from the insert 34 can pass in and/or out of the seat 52.

The body 100 which forms the side channel 133 comprises a wall 144 that has a generally uniform width Wc. However, the wall 144 can have a variable width Wc in other embodiments. The wall 144 comprises an inner surface 146 and an outer surface 148. The inner surface 146 of the wall 144 cooperates with a lower surface 149 of the cover 102 to define an air path or passage 150. In the illustrated embodiment, the wall 144 has a width Wc that is in the range of about 2 mm to 4 mm, such that the wall 144 can provide strength under loading and prevent air from passing through the wall 144. In the illustrated embodiment, the wall 144 has a generally u-shaped cross section and has vertical walls 154, 156 which provide support to the occupant sitting in the seat bottom 32 without collapsing or buckling the insert 34. In one embodiment, an occupant weighing at least 300 lbs. can sit in the seat 52 without causing the u-shaped channel 122 to collapse thereby reducing the airflow through the insert 34. In another embodiment, a person weighing at least 350 lbs. can sit in the seat 52 without causing the insert 34 to collapse. Although not illustrated, the wall 144 can have other shaped cross sections and/or wall thickness that provide support to the occupant without appreciable reduction in the flow rate of air through the air passage 150. These cross sections can also be modified to accommodate seat comfort, strength under loading, varying seat foam thicknesses, and/or other desired characteristics. Additionally, structure members (not shown) can be used to reinforce the insert 34 to further inhibit deformation of the insert 34. As such, in light of this specification, one of ordinary skill in the art can determine the various other combinations of material type, thickness, and shape of the wall 144 to achieve the desired structural support In one embodiment, the walls 154, 156 are separated by a distance in the range of about 11 mm to about 15 mm. Preferably, the walls 154, 156 are separated by a distance of about 13 mm. The wall 144 can define the side channel 122 having a height in a range of about 18 mm to about 22 mm. Preferably, the channel 122 has a height of about 20 mm. In the illustrated embodiment, the channel 122 has a hydraulic diameter of about 12 to 17 millimeters, so that there is an acceptable pressure drop along the side channel 122 and the insert 34 can fit within the seat 52.

The shape of the air passage 150 is preferably configured to promote hydraulic efficiency resulting in uniform distribution of air flowing from the insert 34. That is, the air passage 150 is sized and configured so that the flow rates out of the openings or holes 104 (shown in FIG. 3) are substantially similar to each other.

With reference to FIGS. 3 and 5, and the side channel 122, the air can pass through the manifold 114 and flow into the side channel 122. The air passage 150 is sized such that a portion of the air flows out of the first hole 104 while a second portion of the flow proceeds to a downstream hole 104. In other words, the air proceeds along the air passage 150 of the side channel 122 and a first amount of air passes out of the hole 104 and second amount of air proceeds along the air passage 150 to the downstream hole 104 which is located near the end of the side channel 122. A portion of the second amount of air passes through the downstream hole 104 and out of the insert 34. Preferably, the air flow rates out of the holes 104 located above the air passage 150 of the side channel 122 are substantially similar. In this manner, the occupant of the seat 52 is provided with a generally uniform flow of air from the insert 34 in the region of the side channel 122. Thus, the environment immediately surrounding the person in the seat 52 can be maintained at a generally uniform temperature.

With continued reference to FIG. 5, the channels 116, 118, 120, 124 define a several paths or passages 152, 154, 155, 156, respectively. The configuration of these passages 152, 154, 155, 156 can be similar to the passage 150 associated with the side channel 122 described above and thus will not be discussed in detail. In the illustrated embodiment, the insert 34 is configured such that of the passages 150, 152, 154, 155, 156 of the insert are generally parallel to the surface 60 of the seat assembly 30. With respect to the first channel 118, the associated passage 155 can be configured to extend below the trench 94. When the insert 34 is disposed in the recess region 70, each of the longitudinal axes of the channels of the recessed region 70 are preferably aligned with one of the longitudinal axes of the passages 150, 152, 154, 155, 156.

As mentioned above, in some embodiments, the insert 34 can remove air in the cabin space by causing air within the automobile to flow into the insert 34. The air can then flow through the insert 34 and the manifold 114 and into the fluid line 135. The air proceeds along the fluid line 135 to the fluid device 136. Preferably, air can be passed through the cover 102 and into the air passages 150, 152, 154, 155, 156 and pass along the channels 114, 116, 118, 120, 122, 124 to the manifold 114 with reduced pressure drops across the holes 104. In other words, air passages 150, 152, 154, 155, 156 are sized for a low pressure drops resulting in higher air flow rates to and/or from the seat 52.

With reference to FIG. 6, a seal 158 is formed between the lower surface 149 of the cover 102 and the upper surface 125 of the inner surface 146. The seal 158 inhibits, preferably prevents, air from escaping between the wall 144 of the channel 122 and the cover 102 and out of the insert 34. Thus, air within the air passage 150 can pass out of the insert 34 through either the holes 104 or the opening 130. An adhesive can be used to form the seal 158. However, those skilled in the art recognize that there are other suitable methods for forming the seal 158 such as attaching the cover 102 to the channel 122 with fasteners or the like. Additionally, the cover 102 can be attached to the channel 122 by causing the lower surface 149 and upper surface of the wall 144 to melt together thereby forming seal. In another embodiment, the insert 34, or portions of the insert 34, can be a unitary body formed through, for example, an injection molding process.

The portion of the body 100 that form the channels 114, 116, 118, 122, 124 can be constructed with materials having suitable thermal, structural, and air barrier characteristics. The channels 114, 116, 118, 122, 124 can comprise, but are not limited to, foam, plastics, and composite materials. In one embodiment, the channels 114, 116, 118, 122, 124 are formed of closed cell foam for inhibiting air from passing through the wall 144 of the channels 114, 116, 118, 122, 124 and into the seat 52. Thus, the closed cell foam can advantageously provide an effective barrier for preventing airflow through the wall 144 of the channels 114, 116, 118, 122, 124. The closed cell foam preferably also has low thermal mass so that the channels 114, 116, 118, 122, 124 can be rapidly heated or cooled and, thus, allowing for rapid temperature changes of the air in the passages 150, 152, 154, 155, 156. However, the channels 114, 116, 118, 122, 124 can be formed from opened cell foam having an inner layer (not shown) that is an impermeable air barrier coupled to the inner surface 146. The inner layer can be, for example, a thin coating of plastic for providing an effective barrier to prevent air from flowing through the wall 144.

A further advantage is provided where the body 100 can be light weight for convenient assembly and transport. For example, the body 100 can be formed of foam so such that it can be conveniently carried and inserted into the recess region 70. Transportation cost for shipping the body 100 can be reduced due to its reduced weight. In one embodiment, a plurality of bodies 100 can be stored by inserting the channels of one body 100 into the channels of another body 100. In this manner, a plurality of bodies 100 can be stacked for space effective storage.

As mentioned above, the body 100 is configured to fit conveniently in the recess region 70. The channels 116, 118, 120, 122, 124 preferably have a shape which is similar to the shape of the recess region 70, such that the channels 116, 118, 120, 122, 124 of the body can be received by the channels 74, 76, 78, 80, 82 of the recess region 70, respectively. In one embodiment, the body 100 and seat cushion 72, which defines the recess region 70, can advantageously be deformed to ease manual assembly. In one such arrangement, the body 100 and cushion 72 are made of foam to provide flexible components that can be deformed during assembly. Further, the seat assembly 34 can be produce at low cost because of the availability of inexpensive foam and ease of manufacturing both the insert 34 and contoured seat cushions. The separate parts of the seat 52 advantageously accommodate flexible manufacturing and assembly. For example, the seat cushion 72 can be pre-molded with the recess region 70 or a standard automotive seat cushion can have foam cut out to form the recess region 70. Further, the insert 34 can be compliant to that can conform to the contours of typical vehicle seats.

A further advantage is provided where the body 100 is formed of closed cell foam. The closed cell foam can be moisture resistant and, therefore, prevents moisture within the channels 114, 116, 118, 122, 124 of the insert 34 from entering the cushion 72. This can reduce the formation of mold or other problems associated with moisture impregnated foam. The closed cell foam walls 144 can also prevent the passing of odors through the body 100 because wall 144 is an effective air barrier. Thus, odors from the seat cushion 72 are prevented from passing through the body 100 and into the air passages 150, 152, 154, 155, 156 and contaminating the air flowing in the body 100. Likewise, odors carried by the air flow within the air passage 150, 152, 154, 155, 156 advantageously cannot pass through the wall 144 and contaminate the cushion 72.

The cushion 72 and the body 100 are preferably also formed from materials to advantageously reduce the level of noise (e.g., squeaking) created by the movement of the occupant moving in the seat 52. Preferably there is no appreciable audible noise due to the occupant's movements.

In one such embodiment, the seat cushion 72 and the body 100 are both made of foam so that there is substantially no audible noise created when there is relative movement between the body 100 and the recess region 70. As the occupant in the seat 52 moves, outer surfaces 159 of the body 100 can move against the surfaces of the recess region 70 and provides preferably no audible noise. The interaction between the foam forming the cushion 72 and the foam forming the body 100 may not produce any appreciable noise when the person in the seat 52 moves, even if the surfaces of the body 100 and cushion 72 contacting each other move relative to each other. In other embodiments, the outer surface 159 of the body 100 can be coupled to the surfaces of the recess region 70 to limit relative movement between the body 100 and recess region 70 to further reduce noise. In one embodiment, an adhesive can be used to couple the outer surface 159 of the body 100 and the recess region 70 and thereby reduces relative movement between the body 100 and the recess region 70. In other embodiments, the body 100 and the recess region 70 are made from different materials still configured to reduce noise. For example, the recess region 70 can be formed from the foam of cushion 72, and the body 100 can be formed of a compliant plastic. It is also contemplated that the outer surfaces 159 of the body 100 that contact the recess region 70 can be treated to reduce the noise cause by the occupant's movement.

With continued reference to FIGS. 1 and 3, the body 100 of the insert 34 can be configured such that it deforms to the shape of the occupant sitting in the seat 52. The body 100 and cover 102 can be formed from material that is preferably similar to material that forms the cushion 72 so that the occupant cannot differentiate between the cushion 72 and the insert 34 when sitting in the seat 52. In this manner, the seat bottom 32 can provide uniform support to the occupant to reduce any discomfort of the occupant by having dissimilar materials in the seat bottom 32, even though the insert 34 is located just below the upholstery (not shown). Conventional structures inserted into seat cushions can be made of materials that are stiff, many times stiffer than foam, and therefore can cause discomfort of the occupant within the seat. In contrast, the flexible insert 34 can be inserted into the recess region 70 and can provide similar support as the cushion 72 for a comfortable sitting area.

As mentioned above, an adhesive can be used to ensure that the insert 34 is coupled to the recess region 70 and deforms to the contours of the seat 52. However, there are other suitable arrangements for coupling the insert 34 with the seat cushion 72. In another embodiment, the insert 34 is received into the recess region 70 and the material 63 can hold the insert 34 in the region 70. In yet another embodiment, the insert 34 may be inset molded into a seat cushion during the manufacturing process of the seat. Thus, adhesive may or may not be used to assemble the insert 43 and the cushion 72.

The insert 34 can be advantageously removable for convenient replacement and/or repair. In another embodiment, the insert 34 is received into the recess region 70 and the material 63 and fasteners can hold the insert 34 in the region 70. The material 63 and fasteners can be removed so that the insert 34 can be lifted out of the recess region 70 for replacement or repair.

As mentioned above, the channels 116, 118, 120, 124 can be formed in a manner generally as described with respect the side channel 122 and, thus, will not be described in detail. In some embodiments, however, the individual channels 116, 118, 120, may have different shapes and configurations than the side channel 122 and can be different from each other. As mentioned above, it is contemplated that the body 100 can have various configurations of channels with, for example, a different number of channels, channels of different shapes, cross sections and/or sizes to achieve adequate air flow through the insert 34.

With reference to FIG. 3 and FIG. 4, the illustrated cover 102 comprises a plurality of elongated portions 162, 164, 166, 168, a central portion 180, and an elongated central portion 184, which are generally configured to match the shape of the channels 115, 118, 120, 122, 124 of the illustrated embodiment. One end of the elongated portions 162, 164 are connected to the central portion 180 of the cover 102. The elongated portions 166, 168 are connected to the elongated central portion 184 of the cover 102. The elongated portion 184 has a channel 182 which is preferably configured to mate with the tie-down trench 94. The channel 182 can be generally u-shaped. However, in other embodiments the channel 182 can have other configurations suitable for mating with at least a portion of the tie-down trench 94.

Each of the elongated portions 162, 164, 166, and 168 has preferably at least one hole 104 for delivering and/or receiving air. In the illustrated embodiment, the proximal elongated portions 162, 164 have two holes 104 and the distal elongated portions 166, 168 have a single hole 104. However, the elongated portions 162, 164, 166, and 168 can have any number of holes 104 suitable for delivering and/or receiving air as described in further detail below. For example, the elongated portion 162 can have at least three holes 104 for receiving or expelling air.

In the illustrated embodiment, the central portion 180 of the cover 102 is generally elliptical in shape to correspond to the illustrated manifold 114. One end of the proximal elongated portions 162, 164 is attached to opposing sides of the central portion 180. The first elongated portion 184 is attached to another side of the central portion 180 and extends between the central portion 180 and the distal elongated portions 166, 168.

With continued reference to FIGS. 3 and 4, the u-shaped groove or channel 182 of the cover 102 comprises a bottom surface 190, and a pair of sides 192, 194. The bottom 190 and the sides 192, 194 can define a portion of the tie-down trench 94 or can be disposed below the tie-down trench 94. Optionally, the bottom 190 and the sides 192, 194 can be disposed between portions of tie-down trench 94.

The distal elongated portions 166, 168 comprise two generally straight elongated portions oriented at an angle to each other. However, as with the channels that they cover, there are other configurations of the elongated potions 166, 168 that are suitable for delivering and/or receiving air. In the illustrated embodiment of FIG. 3, the distal elongated portions 166, 168 have at least one hole 104 for providing fluid communication between the insert 34 and the interior of the vehicle. As discussed above, it is contemplated that the distal elongated portions 166, 168 can have more than one hole 104 for delivering or receiving air to achieve suitable airflow through the cover 102.

The cover 102 can have a generally uniform thickness, as shown in FIG. 4. The cover 102 can provide lateral support to the channels (e.g., channel 122) of the body 100 to prevent buckling or collapse of the insert 34. The cover 102 can inhibit the lateral movement of the upper portion of the wall 144 when the occupant contacts the seat 52. Advantageously, because of the structural support provided by the cover 102 to the channels of the body 100, the channels 116, 118, 120, 122, 124 in combination with the cover 102 result in a durable insert 34 providing sufficient support to the occupant such that the occupant cannot differentiate between the support provided by the insert 34 and the other portions of the seat 52. A further advantage is provided where the cover 102 does not bow or sag into the channels 116, 118, 120, 122, 124. The walls defining the u-shaped channels 116, 118, 120, 122, 124 preferably provide structure support to the cover 102 and prevent the cover 102 from moving into the channels 116, 118, 120, 122, 124. Thus, the cover 102 between the walls of the channels preferably provides support to the person in the seat 52 without forming indentations within the seat. Additionally, the insert 34 can maintain it's shape after many extended periods of use. Thus, the insert 34 can be a durable structure that advantageously does not permanently deform during use.

In light of the disclosure herein, those skilled in the art can determine appropriate size, configuration, and materials used to form the cover 102 depending on the desired characteristics for the insert 34. For example, the cushion 72 can be made from highly compliant material (e.g., a compliant foam) for a plush seat 52. Likewise, the cover 102 can be made of a highly compliant material. The combination of the cushion 72 and the cover 102 can provide a very plush sitting area for the occupant. For a relatively stiff seat, the cushion 72 and cover 102 can be made of less compliant material. In light of the disclosure herein, one of ordinary skill in the art can determine various appropriate combinations of material type, thickness and shape of the cover 102 and the body 100 to achieve the desired feel of the occupant disposed within the seat 52. For example, the cover 102 can be made of a stiff material that distributes loads caused by the person sitting in the seat 52 to the cushion 72. Those skilled in the art recognize that the cover 102 can also be made of a plurality or combination of materials. For example, the cover 102 can comprise an upper fabric layer attached to a lower foam layer.

In the illustrated embodiment, a flange 151 of the insert 34 may be formed by a portion of the cover 102 extending beyond the flange 112 of the body. The flange 151 formed by the cover 102 and the flange 112 of the body 102 can engage with a portion of the cushion 72 (e.g., the periphery of the recess region 70) to further reduce collapse or buckling of the insert 34.

A further advantage is provided where the cover 102 comprises air permeable material. In one embodiment, the cover 102 comprises a homogenous, porous material so that air can migrate through the cover 102. Air can pass through the cover 102 by passing through the hole 104 and/or the air permeable material of the cover 102. The air permeable cover 102 can provide a generally uniformly distributed flow of air between the insert 34 and the cabin space. The cover 102 can be formed of any suitable air permeable material, such as open cell foam.

The cover 102 and the body 100 can be formed of similar materials. In one embodiment, for example, the cover 102 and body 100 are both formed from closed cell foam. The cover 102 and body 100 can cooperate to prevent, for example, air from flowing through the insert 34 and into the seat cushion 32. However, the cover 102 and the body 100 can be formed of different materials. For example, in one embodiment, the cover 102 is formed of open celled foam and the body 100 is formed of closed cell foam. Thus, the cover 102 and body 100 can be formed from a variety of materials depending on the desired flow through and out of the insert 34.

With continued reference to FIG. 3, the holes 104 are used for delivering air to the occupant or for receiving air from the compartment of the automobile. The size of the holes 104 can be increased to achieve a high flow rate through the cover 102 and can be decreased to reduce the flow rate through the cover 102. Also, the shape of the holes 104 can be varied depending on the desired flow rate of air. In the illustrated embodiment, the holes 104 are generally circular in shape and define an air passage through the cover 102 connecting at least one of the air passages 150, 152, 154, 155, 156 and the exterior space outside of the insert 34. However, the holes 104 can have any other shape or configuration that is suitable for passing air between the air passages and the exterior surrounding the cover 102. For example, the holes 104 can be elliptical, square, or the like depending on the desired flow rates through the cover 102. In addition, as mentioned above, the holes 104 may be eliminated if the cover 102 is made of a sufficiently air permeable material.

The holes 104 can be positioned in the cover 102 for efficient air flow through the channels of the body 100. For example, in the illustrated embodiment of FIG. 3, the holes 104 are generally equidistant from the sides of the air passages 150, 152, 154, 155, 156. The holes 104 can be spaced midway between the periphery 106 of the cover 102 and positioned so that air is delivered to desired locations of the occupant. For example, the holes 104 defined in the elongated portions 166, 168 can deliver air to the space or region around the portion of occupant's legs proximate the thigh area 38. To achieve a high flow rate, additional holes 104 can be added to the elongated portions 166, 168 to increase the amount of air flowing to, or away from, the occupant's legs. Similarly, the elongated portions 162, 164 can have additional holes 104 that are located at positions such that the air is delivered to desired locations of the occupant's buttocks. It is contemplated by one of ordinary skill in the art in light of the disclosure herein will be determine the appropriate orientation, location, size, number, and shape of the holes 104 to achieve the desired flow rate and the direction of air for particular environments.

In operation, fluid in the form of air can be delivered along the line 135 to the seat assembly 30. The downstream end of the fluid line 135 is connected to the connector 134, which is connected to the inlet 126 through the opening 130 of the manifold 114. Fluid in the form of air passes from the fluid line 135 through the connector 134 and into the insert 34. The air passes through the manifold 114 and is delivered to the channels 114, 116, 118, 122, 124 that are in communication with the manifold 114. Preferably an amount of air passes into these channels 114, 116, 118, 120, 122, 124 and proceeds through the air passages 150, 152, 154, 155, 156, respectively, until it reaches a hole 104 and passes through both the cover 102 and seat upholstery 63 and into the cabin space of the vehicle in the form of an automobile. The delivered air can be conditioned to provide heating or cooling of the person within the seat 52. For example, air at a low temperature can be delivered out of the seat 52 to cool the person in the seat 52 by convection provided by cool air flowing around the person. The cool air circulates around and against the person to control the temperature of environment proximate to the person and thus the temperature of the person within the seat 52.

The cool air also can reduce the temperature of the seat bottom 32 by conduction. The cool air passing through the seat 52 reduces the temperature of a portion of the seat 32, which in turn can conduct heat away from the person within the seat 52, thus reducing the temperature of the person. Of course, the person can be heated by providing heated air in a similar manner.

The insert 34 thus provides an individualized climate control to the person in the seat 53 to achieve substantially instantaneous heating or cooling. As discussed above, an automotive vehicle exposed to the summer weather, where the vehicle has been parked in an unshaded area for a long period of time, can cause the vehicle seat to be very hot and uncomfortable for the occupant for some time after entering and using the vehicle, even with normal air conditioning. Even with normal air-conditioning, on a hot day, the seat occupant's back and other pressure points may remain sweaty while seated. The insert 34 can be use to simultaneously cool the seat 52 and the occupant within the seat. The insert 34 can also be used to simultaneously heat the seat 52 and the occupant within the seat. In the winter time, it is highly desirable to have the ability to quickly warm the seat of the occupant to facilitate the occupant's comfort, especially where the normal vehicle heater is unlikely to warm the vehicle's interior as quickly. Thus, a broad range of temperatures and climate can be achieved through use of the seat 52 with the insert 34.

In a modified embodiment, air from within the passenger compartment of the automobile can be passed through the upholstery (e.g., material 63) that covers the seat bottom 32 and through the cover 102 and into the insert 34. The air can then flow through the insert 34 in the opposite direction as describe above and into the manifold 114. The air can then flow from the manifold 114 into the fluid line 135 and can be delivered to the fluid device 136. The fluid device 136 can provide suction so that air near the upholstery of the seat 52 passes through the upholstery and into the holes 104 of the insert 34. In this manner, air is taken from the regions surrounding the occupant in the seat 52 and is delivered to a fluid device 136.

The method of delivering and receiving air, as described and illustrated herein, is not limited to the exact sequence of acts described, nor it is necessarily limited to a practice of all acts set forth. Other sequences of events or acts, or less than all the events, or simultaneous occurrence of events, may be utilized in practicing the embodiments of the invention. For example, a controller (not shown) can be provided so that the user can adjust the flow rate of air and/or the temperature of the air being delivered to the person within the seat 52. The occupant can change, for example, the speed of the fan of the fluid device 136, which delivers the air to the insert 34 resulting in the air flowing to the occupant at the desire flow rate.

Figure 7:
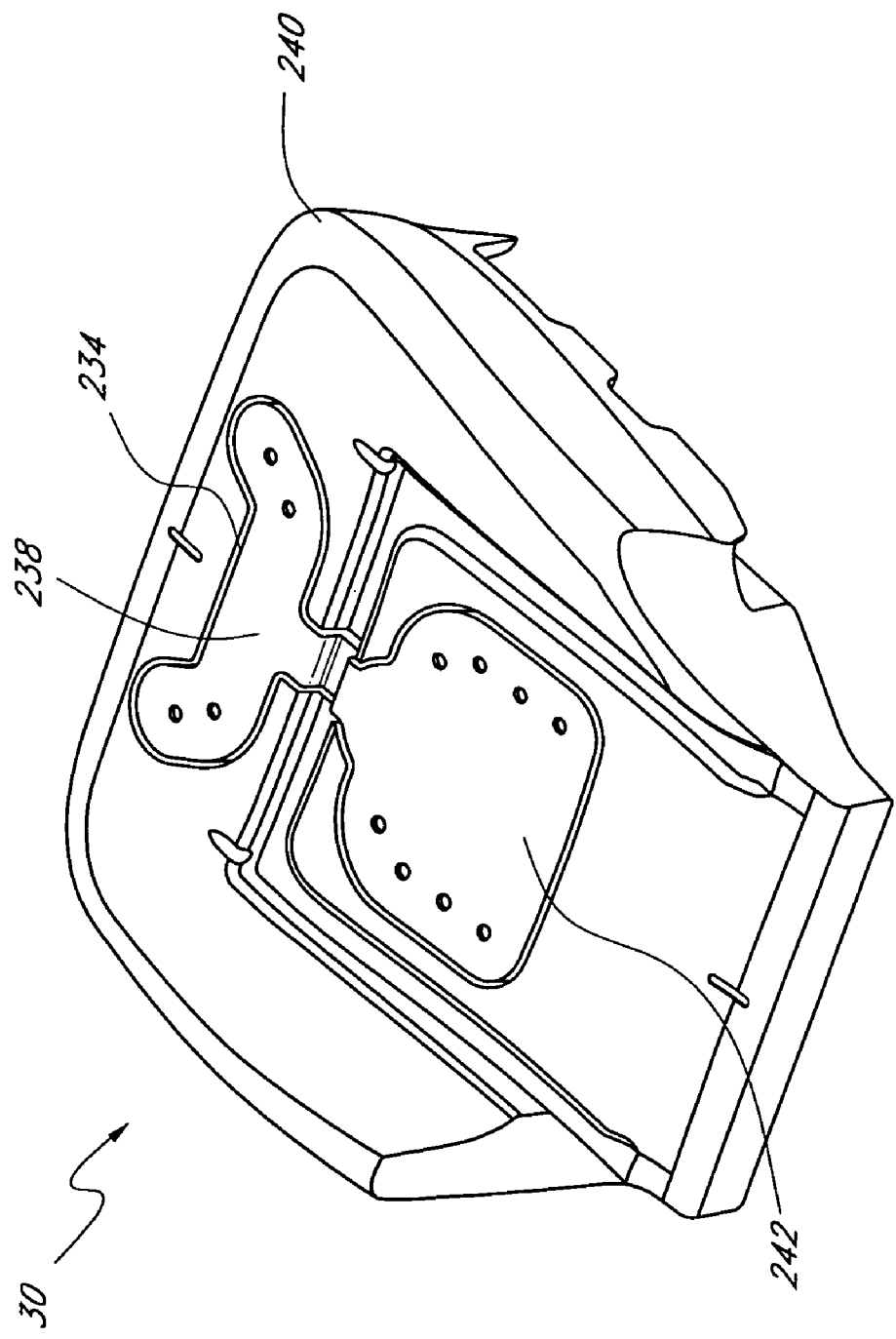
FIG. 7 is a perspective view of a seat bottom with an insert in accordance with another embodiment.
Figure 8:
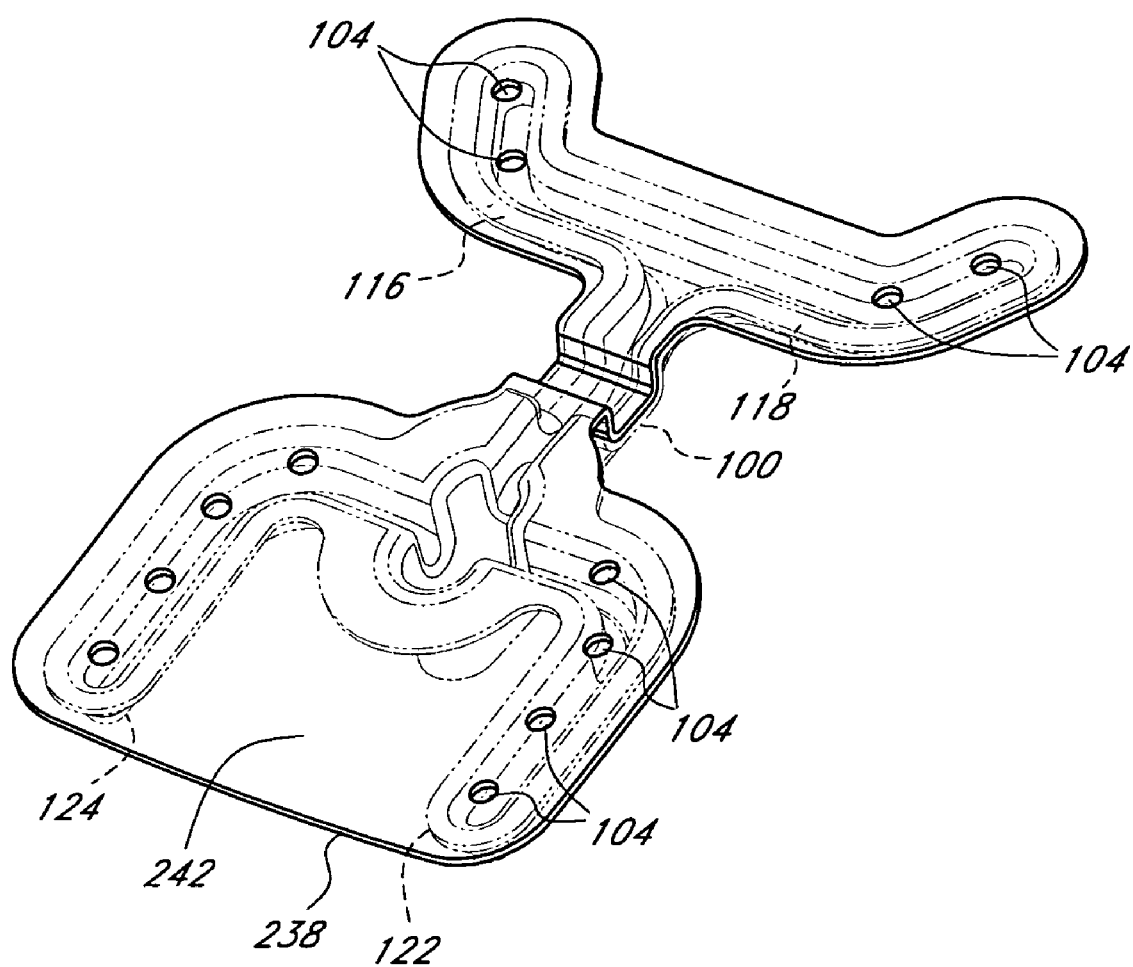
FIG. 8 is a perspective view of the insert of FIG. 7.

With respect to FIG. 7 and FIG. 8, the seat assembly 30 comprises a modified insert 234. In this embodiment, the cover 238 of the insert 234 is generally flush with the surface of cushion 240. That is, the cover 238 and the upper surface or outer surface of the cushion 240 provide a generally continuous surface for the seat 30. The seat 30 can be upholstered with a material to surround the cover 238 and the cushion 240 to provide a smooth, comfortable sitting area.

The cover 238 is generally similar to the cover 102 as described above. However, in this embodiment, the cover 238 has a portion extending between the side channels 122, 124 of the body 100. In the illustrated embodiment, the cover 238 has a central portion 242 that is generally rectangular and flat and extends between the side channels 122, 124. The central portion 242 has several holes 104 that are configured and located so that air can pass from the side channels 122, 124 and through the cover 238. One side of the central portion 242 has four holes 104 spaced along one side channel 122, and the other side of the portion 242 has four holes 104 spaced along the other side channel 124. The cover 238 also has a pair of holes 104 at each end of the branch channels 116, 118. Air can be delivered or received by the insert 234 in a similar manner as described above.

Figure 9:
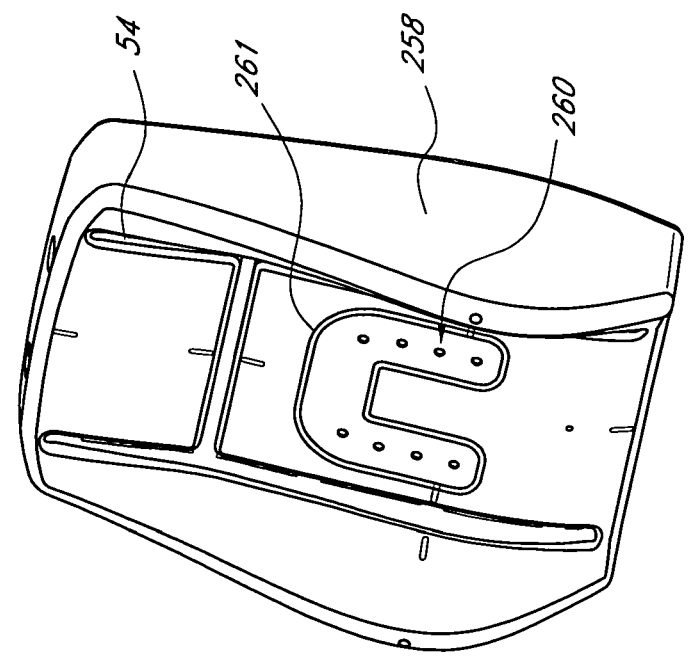
FIG. 9 is a perspective view of the seat back of a vehicle seat, the seat back has an insert.

FIG. 9 illustrates the back assembly 54 of FIG. 1A that is not upholstered and comprises a cushion 258 and another modified embodiment of an insert 260. Air can be delivered or received by the line 135. As illustrated in FIG. 1A, the back assembly 54 can be upholstered using material 63 that is preferably air permeable. As with the insert described above, the insert 260 can be located proximate surface seat back assembly 54 and have fluid channels or passages that are generally parallel to the surface of the seat 52. Although the back assembly 54 can be generally similar to the seat assembly 30, some features of the back assembly 54 are discussed in further detail.

As with the previous illustrated embodiments, the cushion 258 can have a recess region 261 that is configured to receive the insert 260. In the illustrated embodiment, the recess region 261 has a generally u-shaped longitudinal axis. When the insert 260 is disposed in the region 261, the longitudinal axis of the region 261 and the longitudinal axes channels or passages defined by the insert 260 can be generally aligned.

Figure 10:
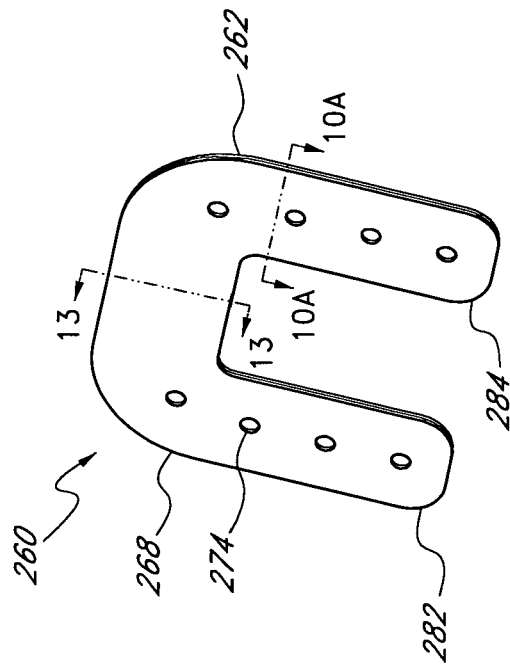
FIG. 10 is a perspective view of the insert of FIG. 9, the insert has a cover and a body.
Figure 10A:
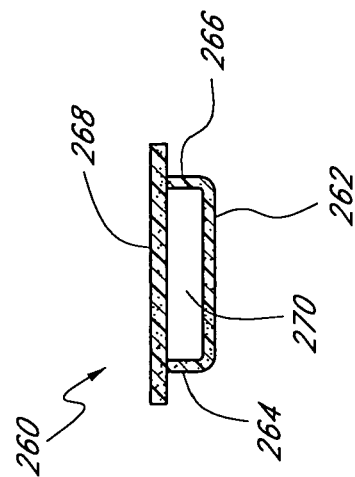

With reference to FIG. 10, the insert 260 comprises a body 262 and a scrim or cover 268. The body 262 can define a fluid passage 270 for transporting air. In the illustrated embodiment, the body 262 is a generally low profile body that has an elongated u-shaped channel shown in FIG. 10A. The body 262 can have the pair of walls 264, 266 that define a portion of the passage 270. In this embodiment, the walls 264, 266 may have a width that is generally less than the width Wc of the wall 144 shown in FIG. 6. When the occupant leans back against the back assembly 54, the walls 264, 266 preferably do not buckle and prevent collapse of the air passage 270. Thus, high flow rates can be achieved even when a person leans back against the back assembly 54. In other embodiments, of course, the width of the walls 264, 266 can be the same size or greater than the width of the Wc of the walls 144.

With continued reference to FIG. 10, the cover 268 can comprise a plurality of holes for passing air through the cover 268. In the illustrated embodiment, the cover 268 is generally flat, u-shaped elongated body having two elongated portions 282, 284 that correspond to the shape of the body 262. In the illustrated embodiment, each of the elongated portions 282, 284 has four holes 274 evenly spaced along its longitudinal axis. However, the holes 274 can be in other locations suitable for passing air through the cover 268.

FIGS. 11 and 12 are side and top views of the insert 260 having a low profile. The upper portion of the insert 260 has an air inlet 290. The inlet 290 can be coupled to a fluid line 300, which is in communication with the fluid line 135 for either delivering air to and/or receiving air from the insert 260.

The length of the walls 264, 266 can be about 8 mm to about 12 mm. In one embodiment, the length of the walls 264, 266 is about 10 mm for a low profile. This low profile provides an insert that can be received in a reduced thickness seat back assembly 54. The seat assembly 54 having the insert 260 in the form of an automobile front seat can advantageously increase the cabin space of the vehicle. For example, the low profile insert 260 can increase the leg room for a person sitting in the back seat of the automobile.

FIG. 13 is a cross sectional view of another portion of the insert 260 taken along line 13—13 of FIG. 10 at the air inlet 290. In this section, the insert 260 comprises the body 262 that is coupled to the cover 268. The insert 260 has an intermediate insert 302 coupled to the cover 268. An adhesive can couple a surface 304 of the intermediate insert 302 to the surface 306 of the cover 268. The intermediate insert 302 and the body 262 in combination define an air passage within the insert 302.

The intermediate insert 302 preferably has a thickness that is generally greater than the cover 268. The intermediate insert 302 provides structural support to the cover 268 so that the cover 268 does not, for example, bow outwards as air is delivered from the line 300 (not shown) into the insert 260. Thus, the line 300 can direct the flow of air towards the cover 268 and the insert 302 without appreciable movement of the cover 268. Movement of the cover 268 could cause discomfort of the person in the seat 52. That is, the intermediate insert 302 diffuses the flow of air outwards towards the channels defined by the body 260 without substantial movement of the cover 268 such that the occupant within the seat 52 does not feel substantial movement of the insert 260 caused by the air flowing within the insert 260. Preferably, the person with the seat 52 does not feel any movement of insert 260 caused by air flowing through the insert 260. However, the person will, of course, feel the air passing out of the insert 34.

In operation, air is delivered along the air line 300 and fed into the air inlet 290. The air then proceeds through the opening 308 defined by the inlet 290 and is divided into air that flows down one elongated portion 282 while another portion of the air flows down the other elongated portion 284. As the air flow proceeds down the channels defined by elongated portions 282, 284 and the body 262, a portion of the air flows through each of the holes 274 disposed along the elongated portions 282, 284. Preferably, the flow rate of the air passing through each of the holes 274 is substantially similar so that a uniform flow is felt by the occupant of the seat 52. Alternatively, air can be sucked into the insert 260 by passing the air from the compartment of the automobile through the holes 274 and into the insert 260. After the air passes through the holes 274 and into the body 262, the air proceeds along the channels defined by cover 268 and the body 262 and is delivered to the air inlet 290. The air then passes through the opening 308 and into the line 300. Thus, the insert 260 can be used to deliver and/or receive air.

With respect to the bottom seat 30 and the back seat 54, air can be passed independently through the inserts 34, 260. For example, the insert 34 can deliver air out of the seat 52 while air is sucked through the insert 260. Additionally, the temperature of the air passing through the inserts 34, 260 can be different and at different flow rates. It is contemplated that there are different combinations and configurations of the fluid systems that can be used to achieve the desired flow rates and fluid temperatures to ensure that the person within the seat 52 is comfortable.

Figure 14:
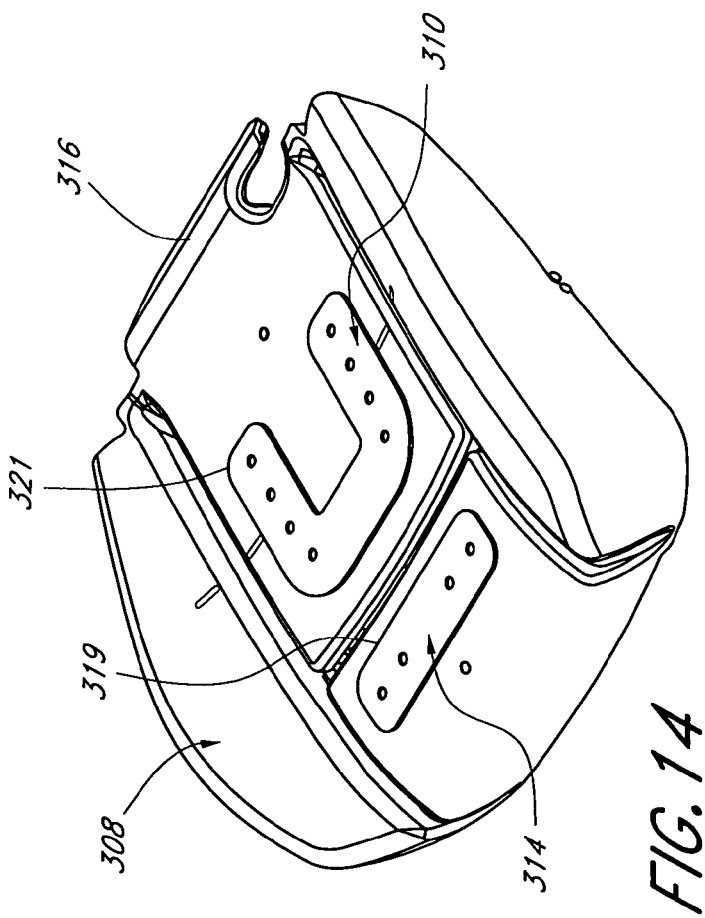
FIG. 14 is a perspective view of a seat bottom of a vehicle seat in accordance with another embodiment.

FIG. 14 illustrates another embodiment of a seat assembly 308 in which the insert does not extend under the trench. The seat assembly 308 comprises an seat area insert 310, a thigh area insert 314, and a cushion 316. In this embodiment, the seat area insert 310 can be generally similar to the insert 260 described above with respect to FIG. 9.

Figure 15:
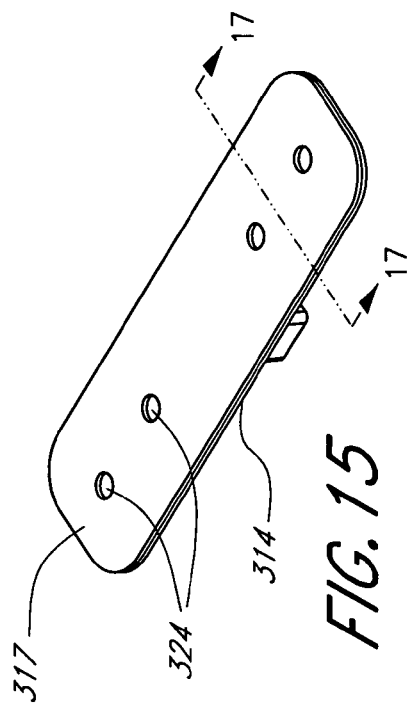
FIG. 15 is a perspective view of the insert of FIG. 14.
Figure 16:
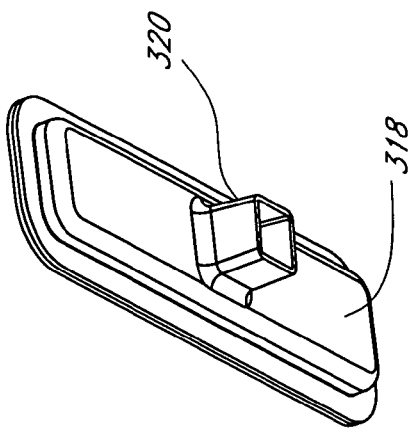
FIG. 16 is another perspective view of the insert of FIG. 14.

As shown in FIG. 14 through FIG. 16, the thigh area insert 314 comprises a cover 317 and a body 318. The cover 317 is generally flat rectangular and configured to attach to the periphery of the body 318. The body 318 comprises an air opening 320 configured to receive a line, such as fluid line 300, and a pair of channels defined by the cover 317 and body 318 on either side of the opening 320. The cover 317 has a plurality of holes 324 for passing air through the cover 317. The thigh area insert 314 is configured to fit at a front end of the seat assembly 308, i.e., the region configured to accommodate the thighs of an occupant.

Figure 17:
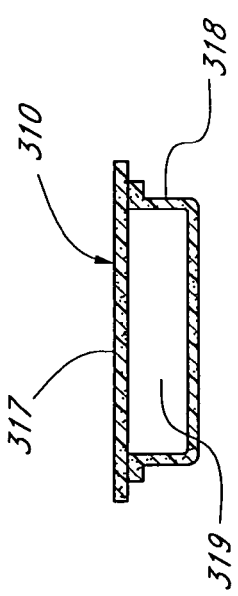
FIG. 17 is a cross sectional view of the insert of FIG. 14 taken along 17—17.

FIG. 17 illustrates a cross section of the cover 317 and body 318 along 17—17. The insert 310 has a generally U-shaped channel defining an air passage 319. However, the insert 310 can define other shaped air passages 319 that are suitable for passing air to holes 324 in the cover 316. Fluid in the form of air can pass through the inserts 310, 314 in a similar manner as discussed above.

The seat cushion 316 has recessed regions 319, 321 for receiving the inserts 314, 310, respectively. The recessed regions 319, 321 have preferably similar shapes as at least a portion of the inserts 310, 314 so that the inserts can mate with the regions 317, 319.

The described embodiments can be formed by using convention techniques for reduced cost of production. The inserts and/or seat cushion, for example, can be formed by vacuum forming processes or can be die cut. These components can thus be made using simple technology. Further, the variety of insert that can be employed in the seat 52 accommodates flexible assembly and seat design. The method of assembling the seat, as described and illustrated herein, is not limited to the exact sequence of acts described, nor it is necessarily limited to a practice of all acts set forth. Other sequences of events or acts, or less than all the events, or simultaneous occurrence of events, may be utilized in practicing the embodiments of the invention.

The above description refers primarily to the use of the method and apparatus in a vehicle seat in the form of automotive seats. But the method and apparatus are equally applicable to other seats, including, but not limited to, theater seats, office seats, airplane seats, seats found in the home such as sofas and recliners, hospital seats for patients, beds for bedridden patients, and wheelchairs. The method and apparatus is especially useful where a localized flow of conditioned air is desired.

The above description refers to the passage of conditioned air through vehicle seats, but is not limited to conditioned air as non conditioned air can be used with the disclosed embodiments. In some embodiments, the ambient air outside of the vehicle can be used by the disclosed embodiments depending on the desired application. Further, the term "fluid" will be used to refer to a gas, a liquid, or a mixture of both.

Although the foregoing description of the preferred embodiments has shown, described, and pointed out certain novel features, it will be understood that various omissions, substitutions, and changes in the form of the detail of the apparatus as illustrated as well as the uses thereof, may be made by those skilled in the art without departing from the spirit of this disclosure. Consequently, the scope of the present invention should not be limited by the foregoing discussion, which is intended to illustrate rather than limit the scope of the invention.

What is claimed is:

1. A vehicle seat comprising:
a seat bottom that comprises a seat cushion that has a front end, a rear end and a pair of sides extending from the rear end to the front end, the seat cushion defining a seat thigh area near the front end of the seat cushion and a seat area between the thigh area and the rear end, the seat cushion further defining a recess region that comprises a hole region extending through the seat bottom and a plurality of channels extending from the hole region; and
an insert comprising a cover and a body, the cover and the body cooperating to define a manifold at least partially positioned in the hole region of the seat cushion and a plurality of elongated passages that extend from the manifold and are at least partially positioned in the plurality of channels of the seat cushion and are disposed adjacent to an upper surface of the seat, the cover having a plurality of openings, each of the openings being in communication with at least one of the plurality of elongated passages so that fluid can pass through the cover through the openings, the body being formed at least in part from of a material that is less permeable to air than a substantial portion of the seat cushion; and
wherein the hole region and manifold are positioned between the seat area and the thigh area of the seat cushion and wherein at least one of the plurality of channels and elongated passages extends from the hole region and manifold towards the thigh region and at least one of the plurality of channels and elongated passages extends from the hole region and manifold towards the rear region.

2. The vehicle seat of claim 1, wherein the body comprises a plurality of channels that define lower portions of the plurality of elongated passages a substantial portion of the channels being adapted to fit within the recess region.

3. The vehicle seat of claim 2, wherein at least one of the plurality of channels has a generally u-shaped cross section.

4. The vehicle seat of claim 3, wherein the body comprises closed cell foam.

5. The vehicle seat of claim 1, wherein the cover has an upper and a lower surface, the lower surface is coupled to the body, and the upper surface is generally flush with an upper surface of the seat cushion when the insert is disposed in the seat cushion.

6. The vehicle seat of claim 5, wherein the cover comprises an air permeable material.

7. The vehicle seat of claim 1, wherein the recess region has a generally u-shaped inner surface, and the insert has a corresponding u-shaped outer surface configured to mate with the inner surface of the recess region.

8. The vehicle seat of claim 1, wherein the elongated passages have a hydraulic diameter in the range of about 12 to 17 millimeters.

9. The vehicle seat of claim 1, wherein the body further comprises a flange that that extends generally parallel to the upper surface of the seat, the cover being coupled to the body at the flange and having a width that is equal to or less than the width of a substantial portion of the plurality of elongated passages.

10. The vehicle seat of claim 1, wherein the cover is coupled to the body by an adhesive.

11. The vehicle seat of claim 1, wherein a portion of the body and the cover is configured to extend beneath a tie down trench of a seat such that at least one of the openings of the cover is on either side of the tie down trench.

12. The vehicle seat of claim 1, further comprising at least one stiffener extending across the at least one of the plurality of channels.

13. The vehicle seat of claim 1, wherein the cover comprises closed cell foam and an adhesive couples the cover and the body.

14. The vehicle seat of claim 1, wherein a substantial portion of the cover is generally flat having a uniform thickness.

* * * * *